(12) United States Patent
Otsuka et al.

(10) Patent No.: US 12,100,039 B2
(45) Date of Patent: Sep. 24, 2024

(54) ARRANGING VIRTUAL OBJECTS IN A VIRTUAL REALITY SPACE

(71) Applicant: Cluster, Inc., Tokyo (JP)

(72) Inventors: Tomotaka Otsuka, Tokyo (JP); Ko Yoshioka, Tokyo (JP); Hiroki Kurimoto, Tokyo (JP); Shoma Sato, Tokyo (JP)

(73) Assignee: CLUSTER, INC., Tokyo (JP)

( * ) Notice: Subject to any disclaimer, the term of this patent is extended or adjusted under 35 U.S.C. 154(b) by 0 days.

(21) Appl. No.: 18/198,850

(22) Filed: May 18, 2023

(65) Prior Publication Data

US 2023/0377028 A1  Nov. 23, 2023

(30) Foreign Application Priority Data

May 18, 2022 (JP) ................................ 2022-081210

(51) Int. Cl.
*G06Q 30/00* (2023.01)
*G06Q 20/12* (2012.01)
(Continued)

(52) U.S. Cl.
CPC ....... *G06Q 30/0643* (2013.01); *G06Q 20/123* (2013.01); *G06T 19/20* (2013.01);
(Continued)

(58) Field of Classification Search
CPC .. G06Q 30/0643; G06Q 20/123; G06T 19/20; G06T 2219/2016; G06T 2219/2004
(Continued)

(56) References Cited

U.S. PATENT DOCUMENTS

| 2002/0002514 | A1 | 1/2002 | Kamachi et al. |
| 2002/0052918 | A1 | 5/2002 | Rekimoto et al. |
| 2022/0036618 | A1* | 2/2022 | Kondoh ................ A63F 13/792 |

FOREIGN PATENT DOCUMENTS

| CN | 114307173 A | 4/2022 |
| JP | 2002-015156 A | 1/2002 |

(Continued)

OTHER PUBLICATIONS

Lee, L.-H., Braud, T., Zhou, P., Wang, L., Xu, D., Lin, Z., Kumar, A., Bermejo, C., & Hui, P. (2021). All One Needs to Know about Metaverse: A Complete Survey on Technological Singularity, Virtual Ecosystem, and Research Agenda. https://doi.org/10.13140/RG.2.2.11200.05124/8 (Year: 2021).*

(Continued)

*Primary Examiner* — Anand Loharikar
(74) *Attorney, Agent, or Firm* — XSENSUS LLP

(57) ABSTRACT

An information processing apparatus includes an acquisition unit that acquires information indicating an unpurchased item, an unpurchased item processing unit that executes unpurchased item arrangement processing of arranging the unpurchased item in a virtual reality space on the basis of the information indicating the unpurchased item, a purchase unit that executes purchase processing of the unpurchased item on the basis of purchase operation information indicating a purchase operation after arrangement in the virtual reality space, and a purchased item processing unit that executes the purchased item arrangement processing of arranging the purchased item after the purchase processing of the unpurchased item.

18 Claims, 7 Drawing Sheets

(51) Int. Cl.
*G06Q 30/0601* (2023.01)
*G06T 19/20* (2011.01)

(52) U.S. Cl.
CPC .............. *G06T 2219/2004* (2013.01); *G06T 2219/2016* (2013.01)

(58) Field of Classification Search
USPC .............................................. 705/26.1–27.2
See application file for complete search history.

(56) References Cited

FOREIGN PATENT DOCUMENTS

| JP | 2002-083320 A | 3/2002 |
| JP | 2019-168934 A | 10/2019 |
| JP | 2020-018633 A | 2/2020 |
| JP | 6714633 B2 | 6/2020 |
| JP | 2020-127689 A | 8/2020 |
| JP | 2020-171596 A | 10/2020 |
| JP | 2021-047722 A | 3/2021 |
| JP | 2022-025461 A | 2/2022 |
| JP | 2022-036691 A | 3/2022 |

OTHER PUBLICATIONS

Notice of Reasons for Refusal mailed on Aug. 30, 2022, received for JP Application 2022-081210, 11 pages including English Translation.

Decision to Grant mailed on Jan. 24, 2023, received for JP Application 2022-081210, 3 pages including English Translation.

* cited by examiner

ARRANGING VIRTUAL OBJECTS IN A VIRTUAL REALITY SPACE

CROSS-REFERENCE TO RELATED APPLICATION

This application claims priority from Japanese Application No. 2022-081210, filed on May 18, 2022, the contents of which are incorporated by reference herein in its entirety.

BACKGROUND

1. Technical Field

The present disclosure relates to an information processing apparatus, a program, and an information processing method.

2. Description of the Related Art

The virtual reality technology is a technology for allowing a virtual world constructed on a computer to be experienced like a real world. This virtual world is a world constituted by various virtual objects, and is also called virtual reality space or virtual reality (VR) space.

Conventionally, as a technology for supporting a creation activity by a creator (hereinafter also referred to as a "space creator") of a virtual reality space, there has been a technology in which virtual objects (hereinafter referred to as "items") of various forms that can be arranged in the virtual reality space are prepared in advance and can be used by the space creator. These items are created as three-dimensional data and provided by an item provider.

For example, Japanese Patent No. 6714633 describes a VR content creation device in which a VR content creator can appropriately select object data necessary for creating VR content from a website listing object data uploaded by an object (item) creator, download the object data to the content creation device in advance, and create VR content using the downloaded object data.

SUMMARY

Examples of the items to be used to create the virtual reality space include items provided for free from the item provider (hereinafter referred to as "free item") and items provided for a fee (hereinafter referred to as "pay item"). It is useful for the space creator to determine whether or not it is necessary to purchase a pay item after confirming the state in which the pay item is arranged in the virtual reality space. The conventional virtual reality space creation support technology has a problem that the space creator cannot confirm the state in which an unpurchased pay item (hereinafter referred to as "unpurchased item") is arranged in the virtual reality space.

The conventional technology described in Japanese Patent No. 6714633 does not consider a case where an object (item) is provided for a fee, and does not solve the above problem.

The present disclosure solves the above problem, and an object thereof is to obtain an information processing apparatus, a program, and an information processing method that enable confirming a state in which an unpurchased item is arranged in a virtual reality space.

An information processing apparatus according to the present disclosure includes an acquisition unit that acquires information indicating an unpurchased item that is a selected unpurchased pay item among pay items that are pieces of three-dimensional data arrangeable in a virtual reality space, an unpurchased item processing unit that executes unpurchased item arrangement processing of arranging the unpurchased item in the virtual reality space on the basis of the information indicating the unpurchased item, a purchase unit that executes purchase processing of the unpurchased item on the basis of purchase operation information indicating a purchase operation of the unpurchased item performed after arrangement in the virtual reality space, and a purchased item processing unit that executes purchased item arrangement processing of arranging a purchased item that is the pay item purchased in the virtual reality space after the purchase processing of the unpurchased item.

According to the present disclosure, information indicating an unpurchased item that is a selected unpurchased pay item among pay items that are pieces of three-dimensional data arrangeable in a virtual reality space is acquired, and unpurchased item arrangement processing of arranging the unpurchased item in the virtual reality space is executed on the basis of the information indicating the unpurchased item. Purchase processing of the unpurchased item is executed on the basis of purchase operation information indicating a purchase operation of the unpurchased item performed after arrangement in the virtual reality space, and purchased item arrangement processing of arranging a purchased item that is the pay item purchased in the virtual reality space is executed. Therefore, the information processing apparatus according to the present disclosure enables confirmation of a state in which the unpurchased item is arranged in the virtual reality space.

DETAILED DESCRIPTION

First Embodiment

Figure 1:
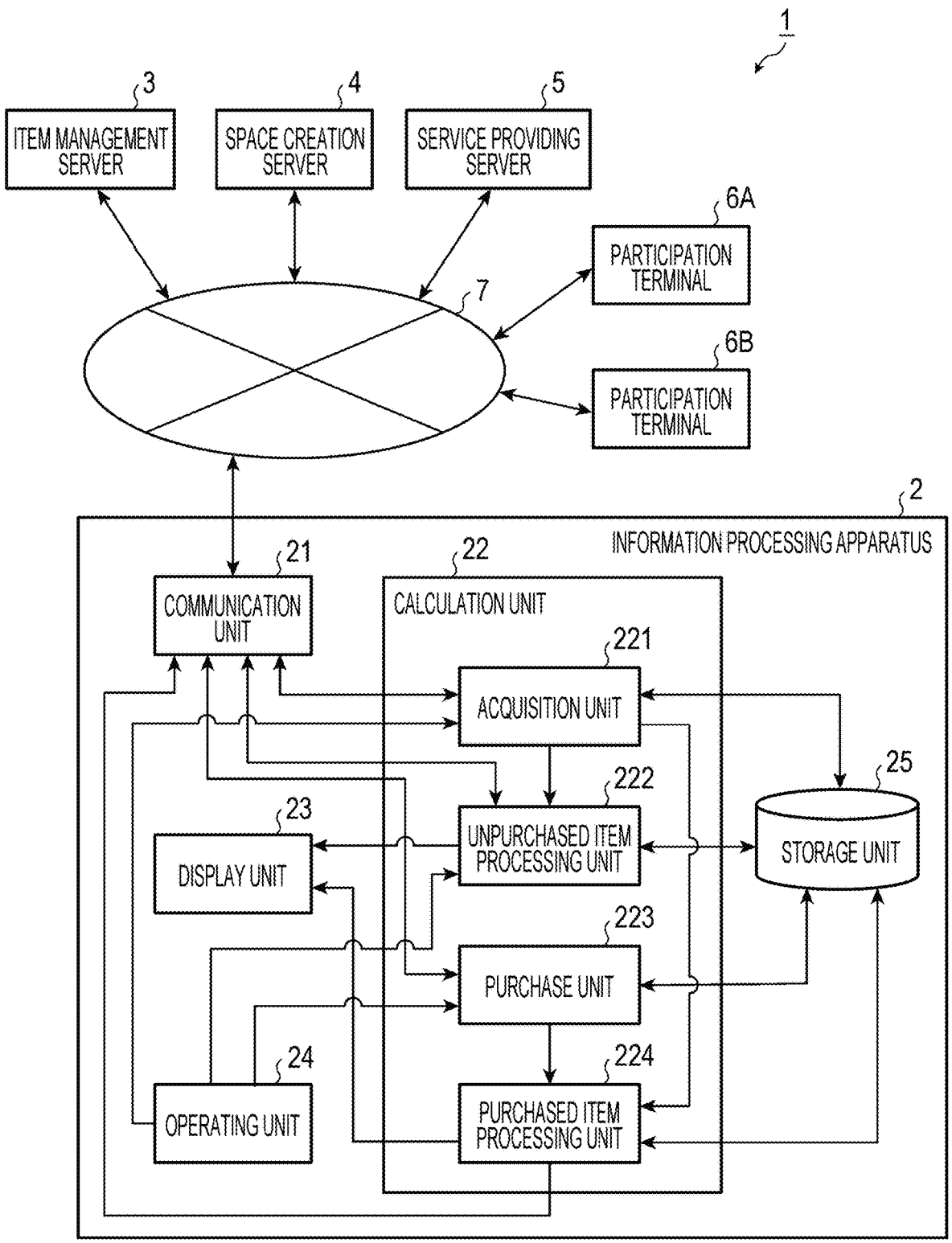
FIG. 1 is a block diagram illustrating a configuration of an information processing system according to a first embodiment.

FIG. 1 is a block diagram illustrating a configuration of an information processing system 1 according to a first embodiment. In FIG. 1, the information processing system 1 is a system in which an information processing apparatus 2, an item management server 3, a space creation server 4, a service providing server 5, a participation terminal 6A, and a participation terminal 6B are connected via a network 7. As the network 7, an existing electric communication line can be used, and is, for example, the Internet. Note that, in the first embodiment, the item management server 3, the space creation server 4, and the service providing server 5 are independent servers, but the functions of two or more of these servers may be implemented by one server, or the functions of one of these servers may be implemented by a plurality of servers.

(Outline of Information Processing Apparatus)

The information processing apparatus 2 acquires information indicating an unpurchased item that is a selected unpurchased pay item among pay items that are three-dimensional data arrangeable in a virtual reality space, executes unpurchased item arrangement processing of arranging the unpurchased item in the virtual reality space on the basis of the information indicating the unpurchased item, executes purchase processing of the unpurchased item on the basis of purchase operation information indicating a purchase operation of the unpurchased item performed after arrangement in the virtual reality space, and executes purchased item arrangement processing of arranging a purchased item that is the purchased pay item in the virtual reality space after the purchase processing of the unpurchased item.

In the information processing system 1, part or all of the functions of the information processing apparatus 2 may be provided in a terminal (hereinafter referred to as a "space creation terminal") used by a space creator for creating a virtual reality space, or may be provided in the space creation server 4. Furthermore, in the information processing system 1, the space creation terminal and the space creation server 4 may be provided with part or all of the functions of the information processing apparatus 2 in an overlapping manner Hereinafter, it is assumed that at least the space creation terminal has all the functions of the information processing apparatus 2. In a case where there is no particular description, the "information processing apparatus 2" is used in the same meaning as the "space creation terminal".

The information processing apparatus 2, the participation terminal 6A, and the participation terminal 6B are, for example, a smartphone, a tablet terminal, or a personal computer (PC). Furthermore, the information processing apparatus 2, the participation terminal 6A, and the participation terminal 6B may be head mounted displays having a communication function, which are used together with the controller.

For example, the user wearing the head mounted display on the head and holding the controller in the hand can operate the virtual reality space displayed on the head mounted display by moving the head or the hand or operating a button or the like of the controller.

That is, the information processing apparatus 2, the participation terminal 6A, and the participation terminal 6B are only required to be devices that display the virtual reality space and can operate the virtual reality space.

The information processing apparatus 2 can communicate with at least the item management server 3 or the space creation server 4 via the network 7. The participation terminal 6A and the participation terminal 6B can communicate with at least the space creation server 4 or the service providing server 5 via the network 7.

The user in the first embodiment includes a space creator who is a user who uses the information processing apparatus 2 to create a virtual reality space, and a participant who is a user who uses the participation terminal 6A and the participation terminal 6B to participate in the virtual reality space, for example, as an avatar.

The creation of the virtual reality space is a process of editing space data under creation to be described later managed by the space creation server 4 by an operation (hereinafter referred to as a "space creating operation") for space creation performed by the space creator using the information processing apparatus 2. The space creator is a user having editing authority of the virtual reality space. The space creator may create the virtual reality space while participating in the virtual reality space under creation as an avatar as described later using the information processing apparatus 2, and in this case, the space creator is a participant having editing authority of the virtual reality space. Therefore, hereinafter, the space creator may be referred to as a "participant". On the other hand, participants other than the space creator are users who do not have the editing authority of the virtual reality space or participants who do not have the editing authority of the virtual reality space. Hereinafter, a participant who does not have the editing authority of the virtual reality space may be referred to as a "general participant". Note that the virtual reality space may not only allow participation as an avatar, but may also simply allow browsing.

Details of the information processing apparatus 2 will be described later.

(Item Management Server)

The item management server 3 manages a plurality of items. The item is, for example, a virtual three-dimensional stationary or mobile object that can be arranged in a virtual reality space. The stationary object is an item whose position in the virtual reality space is fixed, and cannot be moved by a participant in the virtual reality space for participation as described later. The mobile object is an item whose position in the virtual reality space is not fixed in whole or in part, and the whole or in part can be moved by a participant in the virtual reality space for participation.

The item management server 3 can manage various items uploaded from various item providers via the network 7. Thus, the item management server 3 can manage a wide variety of items. In addition, the space creator can create the virtual reality space with variety by creating the virtual reality space using a wide variety of items managed by the item management server 3.

The item management server 3 manages three-dimensional data, simple display data, and metadata for each of a plurality of items. For example, three-dimensional data, simple display data, and metadata are stored in association with each other for each of a plurality of items in a storage device (hereinafter referred to as a "storage device for the item management server") accessible by the item management server 3.

The three-dimensional data of the item is data representing the item in the virtual reality space. In other words, the entity of the item is three-dimensional data. The three-dimensional data of the item includes, for example, three-dimensional shape information, size information, color information, and characteristic information of the item. The characteristic information is characteristic information indicating a virtual material of the item, and the characteristic information includes, for example, a parameter indicating a texture of the item and an applied shader, a parameter indicating sound when the item collides with another object, or a parameter indicating a physical characteristic.

The plurality of items managed by the item management server 3 includes a plurality of items having the same three-dimensional shape and characteristics indicating colors or virtual materials different from each other. For example, pieces of three-dimensional data of a plurality of items having the same three-dimensional shapes includes coloring information different from each other or characteristic information different from each other.

The simple display data of the item is data for simply displaying the appearance of the item to an extent that each item can be identified. The simple display data of the item is, for example, two-dimensional data indicating the appearance of the item or three-dimensional data indicating the appearance of the item. In addition, the simple display data of the item may include a character string indicating the item name in addition to the data indicating the appearance of the item. The data amount of the simple display data of the item is smaller than the data amount of the three-dimensional data of the item.

The metadata of item is additional information for each item. The metadata of item includes at least information (hereinafter referred to as the "item identification information") identifying the item. The item identification information is, for example, an ID (hereinafter referred to as the "item ID") unique to each item. The item ID is expressed by, for example, a character string. Hereinafter, it is assumed that the item identification information is the item ID.

In addition, information (hereinafter referred to as "charging information") indicating whether each item is a free item or a pay item is managed. In addition, the item management server 3 manages, for each space creator, information (hereinafter referred to as "purchase state information") indicating whether each pay item has been purchased or has not been purchased by the space creator for a plurality of pay items.

As an example of a mode for the item management server 3 to manage the charging information, for example, the charging information is included in the metadata associated with the item ID of each item.

The charging information in this case is, for example, information indicating an amount of money required to purchase an item (hereinafter referred to as "item price") by a numerical value. In this case, for a certain item, if the charging information associated with the item ID is "0", the item management server 3 can determine that the item is a free item, and if the charging information is a numerical value larger than 0, the item management server 3 can determine that the item is a pay item and how much the item price is.

Furthermore, in a case where the item price is a fixed amount common to all items, the charging information may be, for example, information as a flag in which "0" is given for a free item and "1" is given for a pay item. In this case, for example, the item price of the pay item is stored in advance in the storage device for the item management server. Therefore, for a certain item, if the charging information associated with the item ID is "0", it can be determined that the item is a free item. In addition, if the charging information of a certain item is "1", the item management server 3 can determine that the item is a pay item, and can also determine how much the item price of the item is by accessing the storage device for the item management server. Note that it is desirable that the space creator be notified of the item price of the pay item in advance.

In addition, as another example of a mode for the item management server 3 to manage the charging information, for example, a list of pay items is stored as the charging information in the storage device for the item management server.

In the list of the pay items, for example, the item IDs of the pay items are registered by being divided for each item price of the pay items. In this case, the item management server 3 refers to the list of the pay items, and if the item ID of a certain item is not registered in the list, the item management server 3 can determine that the item is a free item, and if the item ID is registered, the item management server 3 can determine that the item is a pay item and how much the item price of the item is.

Furthermore, in a case where the item price is a fixed amount common to all items, for example, the item price of the pay item may be stored in advance, and at least one of a list of pay items having no classification based on the item price or a list in which the item IDs of free items are registered may be stored. In this case, the item management server 3 can determine whether a certain item is a pay item or a free item by referring to any list stored in the storage device for the item management server, and can also determine how much the item price of the pay item is by referring to the stored item price.

As an example of a mode for the item management server 3 to manage the purchase state information, for example, the purchase state information is included in the metadata associated with the item ID of each pay item.

The purchase state information in this case is, for example, information that can identify the space creator who has purchased the pay item. For example, the information that can identify the space creator is an ID (hereinafter referred to as a "space creator ID") unique to each space creator. The space creator ID is expressed by, for example, a character string. The metadata may include a name or a handle name of the space creator in association with the space creator ID. In this case, if a space creator ID of a certain space creator is registered in association with the item ID of a certain item, the item management server 3 can determine that the pay item is a pay item that has been purchased by the space creator, and if not registered, the item management server 3 can determine that the pay item is a pay item (unpurchased item) that has not been purchased by the space creator. Hereinafter, the pay item purchased by the space creator will be referred to as a "purchased item".

In addition, as another example of a mode for the item management server 3 to manage the purchase state information, for example, a list of purchased items for each space creator is stored as the purchase state information in the storage device for the item management server.

In the list of purchased items for each space creator, for example, the item IDs of purchased items are registered by being classified for each space creator ID. In this case, the item management server 3 refers to the list of purchased items for each space creator, and if the item ID of a certain pay item is registered in the space creator ID classification of a certain space creator, the item management server 3 can determine that the pay item is a pay item (purchased item) that has been purchased by the space creator, and if not registered, the item management server 3 can determine that the pay item is a pay item (unpurchased item) that has not been purchased by the space creator.

When receiving the request from the information processing apparatus 2 or the space creation server 4, the item management server 3 can transmit the three-dimensional data of the item, the simple display data of the item, the metadata of the item, the charging information of the item, or the purchase state information of the item to the information processing apparatus 2 or the space creation server 4 for all or part of the plurality of items managed by the item management server 3.

When the space creator performs an operation (hereinafter referred to as a "new item selecting operation") of selecting one item from a plurality of items displayed using the simple display data on the information processing apparatus 2, the item management server 3 acquires item selection information via, for example, the space creation server 4. The item selection information includes at least the space creator ID of the space creator who has performed the new item selecting operation and the item ID of the selected item.

Upon acquiring the item selection information, the item management server 3 determines (hereinafter referred to as "charging determination") whether the selected item is a free item or a pay item on the basis of the space creator ID and the item ID included in the item selection information. In a case where the selected item is a pay item, the item management server 3 further determines (hereinafter referred to as "purchase state determination") whether the pay item is a purchased item that has been purchased by the space creator indicated by the space creator ID or an unpurchased item that has not been purchased. Then, the item management server 3 transmits determination results of the charging determination and the purchase state determination for the selected item to the information processing apparatus 2 via, for example, the space creation server 4.

In addition, the item management server 3 transmits the three-dimensional data of the item indicated by the item ID included in the item selection information to the information processing apparatus 2 via the space creation server 4, for example.

When purchase processing to be described later is executed by the information processing apparatus 2, the item management server 3 acquires purchase processing information to be described later, and cooperates with, for example, an external settlement service system to execute settlement processing. The item management server 3 acquires the purchase processing information from the information processing apparatus 2 via, for example, the space creation server 4. The purchase processing information includes, for example, at least the item ID of a pay item to be purchased and the space creator ID of the space creator who purchases the pay item. In addition, the purchase processing information may include the item price of the pay item to be purchased.

The item management server 3 cooperates with an external settlement service system on the basis of the purchase processing information or the like and executes the settlement processing. The external settlement service system is, for example, a system for a cashless settlement service provided by a credit card company, an electronic money company, a settlement agency, or the like.

Upon completion of the settlement processing, the item management server 3 updates the purchase state information in order to manage the pay item indicated by the item ID included in the purchase processing information as the purchased item that has been purchased by the space creator indicated by the space creator ID included in the purchase processing information. The item management server 3 transmits a notification (hereinafter referred to as "purchase completion notification") indicating that the pay item indicated by the item ID included in the purchase processing information has become the purchased item purchased by the space creator indicated by the space creator ID included in the purchase processing information to the information processing apparatus 2 via, for example, the space creation server 4.

In a case where the settlement processing cannot be performed, the item management server 3 may transmit a notification indicating that the settlement processing cannot be performed to the information processing apparatus 2.

(Space Creation Server 4)

The space creation server 4 manages three-dimensional data (hereinafter referred to as "space data under creation") of the virtual reality space under creation by the space creator. The space data under creation includes at least the arrangement position of each item, the arrangement direction of each item, and the three-dimensional data of each item for all items arranged in the virtual reality space. Furthermore, the space data under creation may include, for example, the space creator ID of the space creator who arranged each item for all items arranged in the virtual reality space. In addition, the space creation server 4 manages an ID (hereinafter referred to as "space data ID") unique to the space data under creation. The space data ID is expressed by, for example, a character string.

In a storage device (hereinafter referred to as a "storage device for the space creation server") that can be accessed by the space creation server 4, for example, space data under creation is stored in association with the space data ID. Furthermore, in the storage device for the space creation server, for example, space data IDs of one or more virtual reality spaces being created by the space creator indicated by the space creator ID are stored in association with the space creator ID.

In addition, the storage device for the space creation server stores one or more pieces of initial background template data, which are three-dimensional data of the virtual reality space in a state where editing by the space creating operation has not been performed at all. The initial background template data is, for example, three-dimensional data of a virtual reality space in which only the ground such as a floor having a predetermined size and a distant scene are set.

In a case where there is a virtual reality space under creation, the space creator operates the information processing apparatus 2, selects desired space data under creation from one or more pieces of space data under creation stored in the storage device for the space creation server, downloads the selected data to the information processing apparatus 2, and can continue creation of the virtual reality space. Furthermore, in a case of creating a new virtual reality space, the space creator can operate the information processing apparatus 2 to select desired initial background template data from the one or more pieces of initial background template data stored in the storage device for the space creation server, download the selected data to the information processing apparatus 2, and start creation of the new virtual reality space. In a case where the space creator downloads the initial background template data to the information processing apparatus 2, the space creation server 4 assigns a new space data ID to the initial background template data and transmits the data to the information processing apparatus 2.

The creation of the virtual reality space is processing of editing the space data under creation managed by the space creation server 4 by the space creating operation performed by the space creator using the information processing apparatus 2. The space creation server 4 may enable a space creator to perform a space creating operation using an item while participating in a virtual reality space under creation as an avatar. Furthermore, the space creation server 4 may enable the space creator to perform the space creating operation using the item while browsing the virtual reality space under creation without using the avatar. Hereinafter, it is assumed that the space creation server 4 enables the space creator to perform the space creating operation using the item while participating in the virtual reality space under creation as an avatar.

The space creating operation includes an item selecting operation and an operation of performing various types of processing on an item selected by the item selecting operation (hereinafter referred to as the "item processing operation").

The item selecting operation includes the above-described new item selecting operation of selecting one item from a plurality of items displayed using the simple display data, and an operation (hereinafter referred to as the "existing item selecting operation") of selecting an item (hereinafter referred to as "existing item") already arranged in the virtual reality space.

When the new item selecting operation is performed in the information processing apparatus 2, the space creation server 4 acquires the item selection information transmitted from the information processing apparatus 2. As described above, the item selection information includes the space creator ID of the space creator who has performed the item selecting operation and the item ID of the selected item.

The space creation server 4 transmits the acquired item selection information to the item management server 3. Thereafter, the space creation server 4 acquires the determination results of the charging determination and the purchase state determination for the item indicated by the item ID included in the item selection information from the item management server 3 and transmits the same to the information processing apparatus 2. In addition, the space creation server 4 stores the determination results of the charging determination and the purchase state determination for the item indicated by the item ID included in the item selection information acquired from the item management server 3 in the storage device for the space creation server in association with the space creator ID and the item ID included in the item selection information.

In addition, the space creation server 4 acquires the three-dimensional data of the item indicated by the item ID included in the item selection information from the item management server 3 and transmits the three-dimensional data to the information processing apparatus 2. The space creation server 4 stores the three-dimensional data of the item indicated by the item ID included in the item selection information acquired from the item management server 3 in the storage device for the space creation server in association with the space creator ID and the item ID included in the item selection information.

The item processing operation includes an operation (hereinafter referred to as a "new arrangement operation") of determining an arrangement position or a direction in the virtual reality space of the item selected by the new item selecting operation.

When the new item selecting operation is performed, for example, the selected item is arranged at a predetermined position in the virtual reality space in a predetermined direction (hereinafter simply referred to as an "initial position"), and the selected state of the item is continued. The new arrangement operation is an operation of changing the arrangement position or direction of the item arranged at the initial position and in the selected state to a desired position or direction of the space creator. The space creator can also have the desired position or direction the same as the initial position.

Furthermore, the item processing operation may include an operation of moving the item selected by the existing item selecting operation to another position in the virtual reality space and changing the arrangement position (hereinafter referred to as a "position changing operation"), an operation of changing the item selected by the existing item selecting operation to another direction in the virtual reality space (hereinafter referred to as "direction changing operation"), an operation of deleting the item selected by the existing item selecting operation from the virtual reality space (hereinafter referred to as a "deleting operation"), or the like.

Furthermore, the item processing operation may include an operation of changing the size, an operation of changing the color, an operation of changing the material (hereinafter referred to as an "operation of changing the size or the like"), or the like, for the item selected by the existing item selecting operation.

In addition, when the item processing operation is performed in the information processing apparatus 2, the space creation server 4 acquires item processing information transmitted from the information processing apparatus 2.

The item processing information includes at least the item ID of an item that is a target of the item processing operation, that is, the selected item, and information indicating content of the item processing operation on the selected item. Furthermore, in a case where the item to be subjected to the item processing operation is an existing item, the item processing information further includes information indicating the position of arrangement of the existing item at the time of selection by the item selecting operation.

The information indicating the content of the item processing operation is information indicating the position of arrangement determined by the new arrangement operation, information indicating the position of arrangement changed by the position changing operation, information indicating the direction changed by the direction changing operation, information indicating deletion of the item, or information specifying the operation content of the operation of changing the size or the like.

The transmission of the item processing information from the information processing apparatus 2 to the space creation server 4 is performed, for example, at a timing when it is determined that each item processing operation is temporarily ended.

For example, in a case where the item processing operation is the position changing operation, the space creator can click an existing item to perform the existing item selecting operation, and then move the selected item by a drag operation to change the arrangement position. In this case, it is determined that the item processing operation is temporarily ended at a timing when one drag operation is ended after being started, and the item processing information is transmitted from the information processing apparatus 2 to the space creation server 4.

Furthermore, in a case where the item processing operation is the position changing operation, the space creator can change the arrangement position of the item by inputting a numerical value of each desired coordinate on a screen for inputting a numerical value of each coordinate of the three-dimensional orthogonal coordinate system indicating the position of the item, which is displayed after the existing item selecting operation is performed by clicking the existing item, for example. In this case, it is determined that the creating operation is temporarily ended at the timing when the input of the numerical value of each coordinate is confirmed, and the item processing information is transmitted from the information processing apparatus 2 to the space creation server 4.

The transmission of the item processing information from the information processing apparatus 2 to the space creation server 4 may be performed, for example, at predetermined time intervals. In this case, the information processing apparatus 2 stores the item processing information from the last transmission of the item processing information to the space creation server 4 to the next transmission of the item processing information to the space creation server 4 in a storage unit 25 to be described later, for example, and transmits the stored item processing information to the space creation server 4.

The predetermined time interval may be changed, for example, according to a communication status. For example, in a case where the communication state between the information processing apparatus 2 and the space creation server 4 is good, the information processing apparatus 2 transmits the item processing information to the space creation server 4 at short time intervals, and in a case where the communication state is bad, the information processing apparatus 2 transmits the item processing information to the space creation server 4 at long time intervals.

In a case where the new arrangement operation is performed in the information processing apparatus 2, the new item selecting operation is performed before the new arrangement operation. When the new item selecting operation is performed in the information processing apparatus 2, the information processing apparatus 2 transmits the item selection information to the space creation server 4. Then, as described above, the space creation server 4 acquires the three-dimensional data of the item indicated by the item ID included in the item selection information from the item management server 3.

Upon acquiring the three-dimensional data of the item indicated by the item ID included in the item selection information from the item management server 3, the space creation server 4 first uses the three-dimensional data to edit the space data under creation such that the item is arranged at an initial position in the virtual reality space. The initial position may be, for example, a position determined in advance and stored in the storage device for the space creation server, or may be a position determined according to the position of the avatar of the space creator who has performed the new item selecting operation. The position corresponding to the position of the avatar is, for example, a position separated from the position of the avatar by a predetermined distance in the line-of-sight direction of the avatar.

Subsequently, on the basis of the item processing information indicating the new arrangement operation transmitted from the information processing apparatus 2, the space creation server 4 edits the space data under creation using the acquired three-dimensional data of the item such that the item is arranged in the virtual reality space at the position and direction indicated by the item processing information. The space creation server 4 edits the space data under creation so as to include the information of the position and direction of the item arranged in the virtual reality space by the new arrangement operation and the item ID, and stores the space data under creation after edit in the storage device for the space server.

Note that after arranging the selected item at the initial position, the information processing apparatus 2 may cancel the selection and temporarily confirm the arrangement position. In this case, similarly, the space creation server 4 arranges the selected item at the initial position, and then cancels the selection and temporarily confirms the arrangement position. Furthermore, in this case, the item processing information indicating the new arrangement operation is not transmitted from the information processing apparatus 2 to the space creation server 4.

As described above, the space creation server 4 directly acquires the three-dimensional data of the item selected by the new item selecting operation from the item management server 3 and creates the virtual reality space in the information processing apparatus 2. Thus, as will be described later, the information processing apparatus 2 needs to acquire the three-dimensional data of the item selected by the new item selecting operation from the item management server 3, but does not need to transmit the three-dimensional data of the selected item to the space creation server 4, so that it is possible to reduce the load required for creating the virtual reality space in the information processing apparatus 2.

Furthermore, in a case where an item processing operation other than the new arrangement operation, such as the position changing operation, is performed, for example, the space creation server 4 already has the three-dimensional data of the item that is the target of the item processing operation. Thus, upon acquiring the item processing information other than the new arrangement operation from the information processing apparatus 2, the space creation server 4 can edit the space data under creation on the basis of the three-dimensional data and the item processing information.

In a case where the item processing operation is the position changing operation or the direction changing operation, the space creation server 4 edits the space data under creation so as to include the information of the position and direction of the item after the position changing operation or after the direction changing operation instead of the position and direction of the item before the position changing operation or before the direction changing operation, and stores the space data under creation after edit in the storage device for the space server. When the item processing operation is the deleting operation, the space creation server 4 deletes the data related to the item to be deleted from the space data under creation, and stores the space data under creation after deletion in the storage device for the space server. In a case where the item processing operation is the operation of changing the size or the like, the space creation server 4 edits the space data under creation so as to include the size or the like of the item after the operation of changing the size or the like instead of the size or the like of the item before the operation of changing the size or the like, and stores the space data under creation after edit in the storage device for the space server.

Also in these cases, the information processing apparatus 2 does not need to transmit the three-dimensional data of the item to the space creation server 4, and the load required for creating the virtual reality space in the information processing apparatus 2 can be reduced.

Note that, for example, the information processing apparatus 2 may directly acquire three-dimensional data of an item that is a target of the new arrangement operation from the item management server 3, and transmit the three-dimensional data to the space creation server 4 together with the item processing information indicating the new arrangement operation.

The space creation server 4 may acquire the purchase processing information to be described later transmitted from the information processing apparatus 2 when the purchase processing to be described later is executed in the information processing apparatus 2. When the space creation server 4 acquires the purchase processing information, the space creation server 4 transmits the acquired purchase processing information to the item management server 3.

When a posting operation for posting the space data under creation is performed in the information processing apparatus 2, the space creation server 4 acquires posted information to be described later transmitted from the information processing apparatus 2. The posting is to upload, to the service providing server 5, the space data under creation managed by the space creation server 4 as three-dimensional data (hereinafter referred to as "participation space data") of the virtual reality space for participation in which a participant who does not have the editing authority can participate or browse.

The posted information includes a space data ID as information that can identify the space data under creation to be posted. Upon acquiring the posted information, the space creation server 4 uploads the space data under creation indicated by the space data ID included in the posted information to the service providing server 5.

The space creation server 4 manages the space data under creation even after uploading the space data under creation to the service providing server 5. Therefore, the space creator can continue editing the space data under creation managed by the space creation server 4 even after posting the space data under creation to the service providing server 5. The space creator can post the space data under creation that is further edited after being posted on the service providing server 5, instead of the space data under creation already posted as the participation space data or as new participation space data.

The space creation server 4 may enable a general participant who has no editing authority to participate in the virtual reality space under creation via the network 7 using the participation terminal 6A or the participation terminal 6B.

For example, by operating the information processing apparatus 2, the space creator can transmit, to the space creation server 4, information (hereinafter referred to as "general participation permission information") for setting the presence or absence of permission for the general participant to participate in the virtual reality space under creation. The general participation permission information includes the space data ID of the target space data under creation, and the information specifying the presence or absence of permission for the general participant to participate in the virtual reality space under creation.

Upon acquiring the general participation permission information, the space creation server 4 sets the presence or absence of permission for the general participant to participate in the virtual reality space under creation with respect to the space data under creation indicated by the space data ID included in the general participation sharing information.

The space creation server 4 may enable a certain space creator, in other words, a participant (hereinafter referred to as a "first participant") having editing authority and another space creator different from the first participant, in other words, another participant (hereinafter referred to as a "second participant") having editing authority to participate in the virtual reality space under creation and jointly edit the space data under creation via the network 7 using another space creation terminal.

For example, by operating the information processing apparatus 2, the first participant can transmit, to the space creation server 4, information (hereinafter referred to as "joint editing permission information") for performing setting that allows the second participant to participate in the virtual reality space under creation and edit the space data under creation. The joint editing permission information includes the space data ID of the target space data under creation and the space creator ID of the second participant.

Upon acquiring the joint editing permission information, the space creation server 4 performs setting to permit the second participant to participate in the virtual reality space under creation and edit the space data under creation with respect to the space data under creation indicated by the space data ID included in the joint editing permission information.

The space creation server 4 may allow a plurality of other space creators different from the first participant, in other words, a plurality of other participants having editing authority, to participate in the virtual reality space under creation, and allow three or more space creators to jointly edit the space data under creation.

Hereinafter, editing the space data under creation in cooperation by a plurality of space creators including the first participant will be referred to as "joint editing".

In a case where the space data under creation is jointly edited, the space creation server 4 distinguishes which space creator's new arrangement operation has arranged each item arranged in the virtual reality space. In a case where the space data under creation is jointly edited, when the item processing operation is performed in the information processing apparatus 2 used by each space creator, the space creation server 4 acquires the item processing information transmitted from each information processing apparatus 2. The item processing information in a case where the space data under creation is jointly edited includes at least the space creator ID of the space creator who has performed the item processing operation, the item ID of the target item of the item processing operation, that is, the selected item, and information indicating the content of the item processing operation on the selected item.

As described above, when the new item selecting operation is performed in the information processing apparatus 2, the space creation server 4 acquires the three-dimensional data of the selected item from the item management server 3, and uses the three-dimensional data to arrange the item in the virtual reality space at the position and direction indicated by the item processing information indicating the new arrangement operation transmitted from the information processing apparatus 2. At that time, the space creation server 4 edits the space data under creation such that the space creator ID of the space creator who has performed the new arrangement operation is included in addition to the information of the position and direction of the item arranged in the virtual reality space by the new arrangement operation and the item ID, and stores the space data under creation after edit in the storage device for the space server.

In a case where the item processing operation is the position changing operation, the direction changing operation, the deleting operation, or the operation of changing the size or the like, the space creation server 4 edits data related to the item to be operated in the space data under creation according to each operation, and stores the space data under creation after edit in the storage device for the space server. At that time, the space creation server 4 may edit the space data under creation so as to include the space creator ID of the space creator who has performed the position changing operation, the direction changing operation, the deleting operation, or the operation of changing the size or the like, but does not change at least the space creator ID of the space creator when the item that is the target of the item processing operation thereof is newly arranged.

Therefore, even in a case where the space data under creation is jointly edited, even if each item newly arranged in the virtual reality space is edited by the position changing operation, the direction changing operation, the deleting operation, or the operation of changing the size or the like performed by any space creator thereafter, the space creation server 4 can distinguish which space creator has arranged each item by the new arrangement operation performed by the space creator. Thus, even if each item newly arranged in the virtual reality space is edited by the position changing operation or the like performed by any space creator, the space creation server 4 can determine the arrangement mode or the like of each item on the basis of whether the item is a pay item that has not been purchased or a pay item that has been purchased by the space creator who has performed the new arrangement operation.

Note that, in a case where the item processing operation is the position changing operation, the direction changing operation, the deleting operation, or the operation of changing the size or the like, only in a case where the space creator selects an existing item newly arranged by his or her operation, the space creator may be allowed to set the item as the target of the item processing operation.

(Service Providing Server)

The service providing server 5 manages the participation space data. The service providing server 5 manages, as the participation space data, data as a copy of the space data under creation at the time when the space creation server 4 uploads the space data under creation. That is, at the time when the space creation server 4 uploads the space data under creation to the service providing server 5, the space creation server 4 and the service providing server 5 manage the same space data under creation.

The service providing server 5 provides participants with a service using the virtual reality space for participation represented by the participation space data via the network 7. Using the participation terminal 6A or the participation terminal 6B, a participant can participate as an avatar in the virtual reality space for participation or simply browse the virtual reality space without using the avatar via the network 7.

When the participant participates in the virtual reality space for participation, the participant accesses the service providing server 5 using the participation terminal 6A or the participation terminal 6B, and downloads desired participation space data to the participation terminal 6A or the participation terminal 6B. The participant can move within the virtual reality space for participation represented by the participation space data. In addition, the participant cannot change the position of the stationary object placed in the virtual reality space for participation, but can change the position of the mobile object. However, even in a case where the participant changes the position of the mobile object placed in the virtual reality space for participation, for example, only the participation space data temporarily downloaded to the participation terminal 6A or the participation terminal 6B is changed, or only the copy data of the participation space data managed by the service providing server 5 is changed, and the participation space data managed by the service providing server 5 is not edited. In a case where the participant participates in the virtual reality space for participation, regardless of whether the participant is a participant having editing authority or a general participant who does not have editing authority, he or she is not able to edit the participation space data as the original copy managed by the service providing server 5.

(Details of Information Processing Apparatus)

Details of the information processing apparatus 2 will be described below. As illustrated in FIG. 1, the information processing apparatus 2 includes a communication unit 21, a calculation unit 22, a display unit 23, an operating unit 24, and the storage unit 25.

The communication unit 21 communicates with at least the item management server 3 or the space creation server 4 via the network 7. Furthermore, for example, the communication unit 21 is a communication device capable of mobile communication by a communication system such as LTE, 3G, 4G, or 5G, and communicates with another device such as the item management server 3 or the space creation server 4 connected to the network 7. Furthermore, the communication unit 21 may include a near field communication unit such as Bluetooth (registered trademark).

The calculation unit 22 controls the overall operation of the information processing apparatus 2. The calculation unit 22 includes an acquisition unit 221, an unpurchased item processing unit 222, a purchase unit 223, and a purchased item processing unit 224. When the calculation unit 22 executes an information processing application, the calculation unit 22 implements functions of the acquisition unit 221, the unpurchased item processing unit 222, the purchase unit 223, and the purchased item processing unit 224.

The display unit 23 is a display device included in the information processing apparatus 2. The display unit 23 is, for example, a liquid crystal display (LCD) or an organic electroluminescence (EL) display device. In a case where the information processing apparatus 2 is a head mounted display, a display method of the display unit 23 is a non-transmissive type.

The operating unit 24 is an input device that receives an operation on a space creation screen or the like to be described later displayed on the display unit 23. In a case where the information processing apparatus 2 is a smartphone or a tablet terminal, the operating unit 24 is, for example, a touch panel provided integrally with a screen of the display unit 23. In a case where the information processing apparatus 2 is a PC, the operating unit 24 is, for example, a mouse or a keyboard. In a case where the information processing apparatus 2 is a head mounted display, the operating unit 24 is a head mounted display and a controller used together with the head mounted display.

The storage unit 25 stores, for example, an information processing application and information used for arithmetic processing of the calculation unit 22. The storage unit 25 stores, for example, the three-dimensional data of the item, the simple display data of the item, the metadata of the item acquired from the item management server 3, or the space data under creation acquired from the space creation server 4 as the information used for the arithmetic processing. The storage unit 25 is a storage device included in a computer that functions as the information processing apparatus 2, and includes a storage such as a hard disk drive (HDD) or a solid state drive (SSD), or a memory 103 in FIG. 2.

Figure 2:
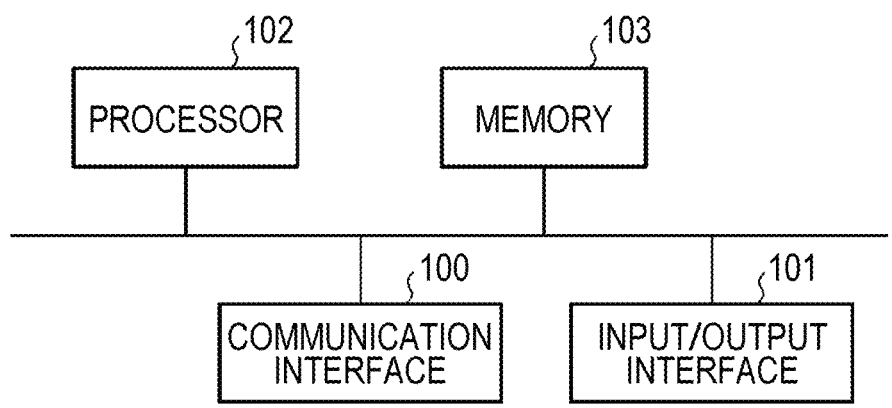
FIG. 2 is a block diagram illustrating hardware components that implement functions of an information processing apparatus according to the first embodiment.

FIG. 2 is a block diagram illustrating hardware components that implement the functions of the information processing apparatus 2. For example, the information processing apparatus 2 includes a communication interface 100, an input/output interface 101, a processor 102, and a memory 103 as hardware components. Respective functions of the acquisition unit 221, the unpurchased item processing unit 222, the purchase unit 223, and the purchased item processing unit 224 included in the information processing apparatus 2 are implemented by executing the information processing application by these hardware components.

The communication interface 100 outputs data received from the item management server 3, the space creation server 4, or the like via the network 7 to the processor 102, and transmits data generated by the processor 102 to the item management server 3 or the space creation server 4 via the network 7. The processor 102 reads and writes data from and to the storage unit 25 in FIG. 1 via the input/output interface 101.

A program constituting the information processing application for implementing the respective functions of the acquisition unit 221, the unpurchased item processing unit 222, the purchase unit 223, and the purchased item processing unit 224 is stored in the storage unit 25. The processor 102 reads the program stored in the storage unit 25 via the input/output interface 101, loads the program into the memory 103, and executes the program loaded into the memory 103. Thus, the processor 102 implements the functions of the acquisition unit 221, the unpurchased item processing unit 222, the purchase unit 223, and the purchased item processing unit 224. The memory 103 is, for example, a random access memory (RAM).

(Pre-Processing)

When the information processing application is executed in the information processing apparatus 2 by the space creator operating the operating unit 24, the information processing apparatus 2 performs pre-processing. The pre-processing is processing performed by the information processing apparatus 2 before the space creator starts the space creating operation using the information processing apparatus 2.

The information processing apparatus 2 displays, as one process of the pre-processing, a login screen for receiving a login operation from the space creator necessary for accessing the space creation server 4. The space creator inputs, for example, the space creator ID and a password on the login screen. The information processing apparatus 2 transmits the input space creator ID and password to the space creation server 4. The space creation server 4 performs authentication processing and transmits the result to the information processing apparatus 2. In a case where the result of the authentication processing by the space creation server 4 indicates success, the information processing apparatus 2 can also access the item management server 3, and can continue subsequent processing including other pre-processing.

The information processing apparatus 2 receives an operation from the space creator as one process of the pre-processing, and acquires, from the space creation server 4, the space data under creation selected by the space creator or the initial background template data selected by the space creator. Upon acquiring the space data under creation or the initial background template data selected by the space creator, the information processing apparatus 2 stores the acquired space data under creation or initial background template data in the storage unit 25. In addition, upon acquiring the space data under creation or the initial background template data selected by the space creator, the information processing apparatus 2 displays the virtual reality space indicated by the acquired data on the display unit 23. By execution of the information processing application, a space creation screen for receiving a space creating operation is displayed on the display unit 23. The information processing apparatus 2 displays the virtual reality space presented by the space data under creation or the initial background template data selected by the space creator in the space creation screen.

In addition, the information processing apparatus 2 acquires simple display data and the item ID of each item for a plurality of items from the item management server 3 as one process of the pre-processing. The plurality of items for which the information processing apparatus 2 acquires the simple display data and the item ID may be all or part of the plurality of items managed by the item management server 3.

The information processing apparatus 2 stores the acquired simple display data and the item ID in association with each other in the storage unit 25. In addition, the information processing apparatus 2 simply displays a plurality of items on the display unit 23 using the simple display data. Hereinafter, the display of the plurality of items using the simple display data on the display unit 23 will be referred to as an "item list". In the item list, the simple display of each item using the simple display data of the item functions as a thumbnail indicating each item to the user in an identifiable manner. In a case where the simple display data of the item includes a character string indicating the item name, the item list may be displayed including the character string.

The information processing apparatus 2 may display the item list in the space creation screen, or may display a screen for the item list different from the space creation screen. In a case where the information processing apparatus 2 displays the item list within the space creation screen, it is desirable to display the item list at a position that does not hinder visual recognition of the virtual reality space by the space creator. As long as the visual recognition of the virtual reality space by the space creator is not hindered, it is desirable that the information processing apparatus 2 display the item list within the space creation screen because it is more easily usable as a user interface (UI) than displaying a screen for simple display of items different from the space creation screen.

The area of the display unit 23 or the space creation screen is limited. In a case where the number of items displayed in the item list is large, it may not be possible to simply display all the items even if the simple display data is used. In such a case, only part of the items may be simply displayed in the item list at the same time using the simple display data, and the remaining items may be sequentially displayed by a scrolling operation.

The information processing apparatus 2 may acquire the three-dimensional data of the item, the metadata of the item other than the item ID, the charging information of the item, or the purchase information of the item in addition to acquiring the simple display data and the item ID of each for the plurality of items from the item management server 3 as one process of the pre-processing. In this case, the information processing apparatus 2 stores the three-dimensional data of the item, the metadata of the item other than the item ID, the charging information of the item, or the purchase information of the item that has been acquired in the storage unit 25 in association with the item ID.

Further, in this case, when displaying the item list, the information processing apparatus 2 may display free items and pay items separately, may display the item price of the pay items, or may display purchased items and unpurchased items separately. Furthermore, when displaying the item list, the information processing apparatus 2 may display which space creator has purchased each purchased item. As described above, the metadata of the item may include a name or a handle name of the space creator in association with the space creator ID. In a case where the name or the like of the space creator is acquired as the metadata of the item, the information processing apparatus 2 may display the name or the like of the space creator who has purchased each purchased item when displaying the item list.

In the pre-processing, the item for which the information processing apparatus 2 acquires three-dimensional data is, for example, an item that is generally frequently used, a free item, or a purchased item that has been purchased by a logged-in space creator and has not been arranged in the virtual reality space. In the pre-processing, for example, the item management server 3 determines of which item the three-dimensional data is transmitted to the information processing apparatus 2 by the item management server 3 that has received a request for three-dimensional data of items from the information processing apparatus 2.

The space creating operation performed by the space creator using the operating unit 24 of the information processing apparatus 2 includes, as described above, the item selecting operation and the item processing operation of performing various types of processing on the item selected by the item selecting operation, and the item selecting operation includes the new item selecting operation of selecting one item from a plurality of items displayed using the simple display data as the item list and the existing item selecting operation of selecting an existing item.

The item processing operation may include the new arrangement operation of determining the arrangement position or direction of the item selected by the new item selecting operation in the virtual reality space, the position changing operation of moving the item selected by the existing item selecting operation to another position in the virtual reality space and changing the arrangement position, the direction changing operation of changing the item selected by the existing item selecting operation to another direction in the virtual reality space, the deleting operation of deleting the item selected by the existing item selecting operation from the virtual reality space, or the like.

In addition, the item processing operation may include the operation of changing the size or the like, such as the operation of changing the size, the operation of changing the color, or the operation of changing the material, for the item selected by the existing item selecting operation.

When the item processing operation is performed, the information processing apparatus 2 generates the item processing information. As described above, the item processing information includes at least the item to be subjected to the item processing operation, that is, the item ID of the selected item, and the information indicating the content of the item processing operation on the selected item. Furthermore, in a case where the item to be subjected to the item processing operation is an existing item, the item processing information further includes information indicating the arrangement position of the existing item at a time point when the item is selected by the item selecting operation. The information indicating the content of the item processing operation is information indicating the arrangement position determined by the new arrangement operation, information indicating the arrangement position changed by the position changing operation, information indicating the direction changed by the direction changing operation, information indicating deletion of the item, or information specifying the operation content of the operation of changing the size or the like.

The information processing apparatus 2 transmits the generated item processing information to the unpurchased item processing unit 222, the purchased item processing unit 224, or the like, and transmits the generated item processing information to the space creation server 4.

As described above, the transmission of the item processing information from the information processing apparatus 2 to the space creation server 4 is performed, for example, at a timing when it is determined that each item processing operation is temporarily ended.

Alternatively, the transmission of the item processing information from the information processing apparatus 2 to the space creation server 4 may be performed, for example, at predetermined time intervals as described above, and the predetermined time interval may be changed, for example, according to the communication status.

When the item selecting operation and the item processing operation are performed, the information processing apparatus 2 edits the space data under creation stored in the storage unit 25. In addition, the space creation server 4 that has acquired the item processing information from the information processing apparatus 2 edits the space data under creation stored in the storage device for the space creation server on the basis of the item processing information. Therefore, the information processing apparatus 2 and the space creation server 4 have substantially synchronously the same space data under creation.

Note that the information processing apparatus 2 can also transmit the item processing information to the space creation server 4, for example, only in a case where the space creator performs a transmission operation. That is, the information processing apparatus 2 and the space creation server 4 may be asynchronous in editing the space data under creation. However, for example, in a case where the joint editing is performed, or the like, it is desirable that the information processing apparatus 2 and the space creation server 4 have the same space data under creation substantially in synchronization.

The information processing apparatus 2 transmits information such as the position and posture of the avatar of the space creator who participates in the virtual reality space to the space creation server 4 at predetermined time intervals. The predetermined time interval may be changed, for example, according to the communication status. For example, in a case where the communication state between the information processing apparatus 2 and the space creation server 4 is good, the information processing apparatus 2 transmits the information of the avatar to the space creation server 4 at short time intervals, and in a case where the communication state is bad, the information processing apparatus 2 transmits the information of the avatar to the space creation server 4 at long time intervals. Therefore, the information processing apparatus 2 and the space creation server 4 share the position and posture of the avatar substantially in synchronization.

Note that the information processing apparatus 2 may not transmit the information of the avatar to the space creation server 4. That is, the information processing apparatus 2 and the space creation server 4 may not share the information of the avatar. However, for example, in a case where the joint editing is performed, or the like, it is desirable that the information processing apparatus 2 and the space creation server 4 share the information of the avatar.

In a case where the joint editing is performed by a plurality of information processing apparatuses 2, the space creation server 4 can share, with another information processing apparatus 2 among the plurality of information processing apparatuses 2, the content of editing in a certain information processing apparatus 2 and the information of the avatar shared from the certain information processing apparatus 2, which are reflected in the space data under creation managed by the space creation server 4.

In a case where the information processing apparatus 2 and the space creation server 4 have the same space data under creation almost in synchronization, and share the information of the avatar, a plurality of space creators who perform the joint editing can confirm the edited content and actions of the avatar with each other in real time.

When the space creator performs a posting operation for posting the space data under creation by operating the operating unit 24, the information processing apparatus 2 generates posted information and transmits the posted information to the space creation server 4. As described above, the posted information includes, for example, the space data ID of the space data under creation to be posted. Upon acquiring the posted information, the space creation server 4 uploads the space data under creation indicated by the space data ID included in the posted information to the service providing server 5.

As described above, since the space creation server 4 manages the space data under creation even after uploading the space data under creation to the service providing server 5, the space creator can post the space data under creation further edited after posting, instead of the posted space data under creation or as new participation space data.

(Acquisition Unit)

The acquisition unit 221 acquires information indicating an unpurchased item that is a selected unpurchased pay item among pay items which are three-dimensional data and can be arranged in the virtual reality space.

As described above, the space creating operation performed by the space creator using the operating unit 24 of the information processing apparatus 2 includes the item selecting operation and the item processing operation, and the item selecting operation includes the new item selecting operation and the existing item selecting operation.

The new item selecting operation is an operation of selecting one item from the item list.

When an item is selected from the item list by the new item selecting operation, the acquisition unit 221 acquires the item ID as information indicating the selected item. The item ID is stored in the storage unit 25 in association with the simple display data in the pre-processing. Since the new item selecting operation is an operation of selecting one item from the item list displayed by using the simple display data, selecting an item by the new item selecting operation means selecting the simple display data. Therefore, the acquisition unit 221 can acquire the item ID stored in the storage unit 25 in association with the simple display data on the basis of the selected simple display data.

If the item selected by the new item selecting operation is a free item, the acquisition unit 221 acquires the item ID indicating the free item from the storage unit 25. In addition, if the item selected by the new item selecting operation is a purchased item, the acquisition unit 221 acquires the item ID indicating the purchased item. Then, if the item selected by the new item selecting operation is an unpurchased item, the acquisition unit 221 acquires the item ID indicating the unpurchased item as information indicating the unpurchased item.

Upon acquiring the item ID of the item selected by the new item selecting operation, the acquisition unit 221 determines whether the type of the item is a free item, a purchased item, or an unpurchased item for the selected item.

Here, at the time of acquiring the item ID of the item selected by the new item selecting operation, in a case where the information processing apparatus 2 does not have information indicating whether the selected item is a free item, a purchased item, or an unpurchased item, there is a case where the information processing apparatus 2 cannot determine the type of the item for the selected item.

In a case where the information processing apparatus 2 acquires the charging information of the item and the purchase information of the item in the pre-processing and stores the items in the storage unit 25, the acquisition unit 221 can also determine whether the selected item is a free item, a purchased item, or an unpurchased item by referring to the charging information and the purchase information stored in the storage unit 25 in association with the simple display data at the time of acquiring the item ID of the item selected by the new item selecting operation.

On the other hand, in a case where the information processing apparatus 2 has not acquired the charging information of the item and the purchase information of the item in the pre-processing, the information processing apparatus 2 does not have information indicating whether the selected item is a free item, a purchased item, or an unpurchased item at the time of acquiring the item ID of the item selected by the new item selecting operation, and the acquisition unit 221 cannot determine which type of item the selected item is.

In a case where the information processing apparatus 2 has not acquired the charging information of the item and the purchase information of the item in the pre-processing, the acquisition unit 221 generates the item selection information after acquiring the item ID of the item selected by the new item selecting operation. The item selection information is information including the space creator ID of the space creator who has performed the new item selecting operation and the item ID of the selected item.

The acquisition unit 221 transmits the generated item selection information to the item management server 3 via, for example, the space creation server 4. As described above, upon acquiring the item selection information, the item management server 3 determines whether the selected item is a free item or a pay item on the basis of the space creator ID and the item ID included in the item selection information. In a case where the selected item is a pay item, the item management server 3 further determines whether the pay item is a purchased item that has been purchased by the space creator or an unpurchased item that has not been purchased. Then, the item management server 3 transmits determination results of the charging determination and the purchase state determination for the selected item to the information processing apparatus 2 via, for example, the space creation server 4. The acquisition unit 221 can determine whether the selected item is a free item, a purchased item, or an unpurchased item by referring to the determination results of the charging determination and the purchase state determination for the selected item acquired from the item management server 3. The acquisition unit 221 stores the determination results of the charging determination and the purchase state determination for the selected item in the storage unit 25 in association with the item ID or the like.

For example, if the selected item is a free item, the storage unit 25 stores information such as a flag indicating that the item is a free item in association with the item ID of the item. For example, if the selected item is a purchased item, the storage unit 25 stores information such as a flag indicating that the item is a purchased item in association with the item ID of the item. Furthermore, for example, if the selected item is an unpurchased item, the storage unit 25 stores information such as a flag indicating that the item is an unpurchased item in association with the item ID of the item.

In addition, upon acquiring the item selection information, the item management server 3 transmits the three-dimensional data of the item indicated by the item ID included in the item selection information to the information processing apparatus 2 via the space creation server 4, for example.

Upon acquiring the three-dimensional data of the item indicated by the item ID included in the item selection information from the item management server 3, the acquisition unit 221 stores the three-dimensional data in the storage unit 25 in association with the item ID or the like.

Note that, in a case where, as one process of the pre-processing, in addition to acquiring the simple display data and the item ID of each item for a plurality of items from the item management server 3, the information processing apparatus 2 acquires the three-dimensional data of the item in the storage unit 25 in association with the item ID, and in a case where the three-dimensional data of the item indicated by the item ID included in the item selection information is stored in the storage unit 25, the acquisition unit 221 can acquire the three-dimensional data from the storage unit 25, and thus it is not necessary to acquire the three-dimensional data from the item management server 3.

For example, by using the item ID of the item selected by the new item selecting operation, the acquisition unit 221 confirms whether three-dimensional data associated with the item ID is stored in the storage unit 25. In a case where the acquisition unit 221 can confirm that the three-dimensional data associated with the item ID is stored in the storage unit 25, for example, the acquisition unit 221 adds a flag or the like indicating that transmission of the three-dimensional data is unnecessary to the item selection information. In a case where a flag or the like indicating that transmission of the three-dimensional data is unnecessary is added to the item selection information, the item management server 3 does not transmit the three-dimensional data of the item to the information processing apparatus 2.

The existing item selecting operation is an operation of selecting an existing item displayed on the display unit 23. The existing item has been selected by the new item selecting operation in the past, and arranged in the virtual reality space by, for example, unpurchased item arrangement processing or purchased item arrangement processing to be described later in a state where determination results of the charging determination and the purchase state determination are obtained. Therefore, the determination results of the charging determination and the purchase state determination for the existing item selected by the existing item selecting operation are stored in the storage unit 25, and the acquisition unit 221 can acquire the item ID of the selected item and determine whether the selected item is a free item, a purchased item, or an unpurchased item.

In addition, regarding the three-dimensional data of the existing item, since the information processing apparatus 2 has acquired the three-dimensional data and stored the three-dimensional data in the storage unit 25 in the past, or the three-dimensional data is included in the space data under creation acquired from the space creation server 4 and stored in the storage unit 25 in the pre-processing by the information processing apparatus 2, the information processing apparatus 2 does not need to newly acquire the three-dimensional data from the item management server 3.

For example, in a case where the same item as the existing item is selected from the item list, formally, the item selecting operation in this case is the new item selecting operation, but since the three-dimensional data has been substantially acquired due to the existence of the existing item and is stored in the storage unit 25, the information processing apparatus 2 does not need to newly acquire the three-dimensional data from the item management server 3.

Also in this case, similarly to the above, by using the item ID of the item selected by the new item selecting operation, the acquisition unit 221 confirms whether three-dimensional data associated with the item ID is not stored in the storage unit 25, whereby the information processing apparatus 2 can avoid acquisition of unnecessary three-dimensional data from the item management server 3.

When the acquisition unit 221 acquires the item ID of the selected item and determines whether the selected item is a free item, a purchased item, or an unpurchased item, the information processing apparatus 2 performs processing such as arrangement processing on the selected item.

For the existing item selected by the existing item selecting operation, regardless of whether the existing item is a free item, a purchased item, or an unpurchased item, the information processing apparatus 2 is only required to edit data related to the existing item in the space data under creation stored in the storage unit 25 on the basis of item processing information indicating the new arrangement operation, the position changing operation, the direction changing operation, the deleting operation, or the operation of changing the size or the like, which is the item processing operation to be subsequently performed.

Hereinafter, processing of the information processing apparatus 2 after the acquisition unit 221 acquires the item ID of the selected item for the item selected by the new item selecting operation and determines whether the selected item is a free item, a purchased item, or an unpurchased item will be described.

(Unpurchased Item Processing Unit)

The unpurchased item processing unit 222 executes unpurchased item arrangement processing of arranging an unpurchased item in the virtual reality space on the basis of the information indicating an unpurchased item.

The unpurchased item arrangement processing is a process including arranging a pay item in the virtual reality space on the basis of the three-dimensional data of a pay item for which at least information such as a flag indicating that the item is an unpurchased item is stored in the storage unit 25 in association with the item ID.

In a case where the acquisition unit 221 determines that the item selected by the new item selecting operation performed by the space creator is a pay item that has not been purchased by the space creator, that is, an unpurchased item, the acquisition unit 221 outputs the item ID of the selected unpurchased item to the unpurchased item processing unit 222 as the information indicating the unpurchased item.

Upon acquiring the item ID from the acquisition unit 221, the unpurchased item processing unit 222 acquires the three-dimensional data of the unpurchased item stored in association with the item ID from the storage unit 25. Upon acquiring the three-dimensional data of the selected unpurchased item, the unpurchased item processing unit 222 first uses the three-dimensional data to edit the space data under creation stored in the storage unit 25 so that the unpurchased item is arranged at the initial position in the virtual reality space. The initial position may be, for example, a position determined in advance and stored in the storage unit 25, or may be a position determined according to the position of the avatar of the space creator who has performed the new item selecting operation. The position corresponding to the position of the avatar is, for example, a position separated from the position of the avatar by a predetermined distance in the line-of-sight direction of the avatar. The setting of the initial position in the information processing apparatus 2 is the same as the setting of the initial position in the space creation server 4.

The unpurchased item processing unit 222 edits the space data under creation so as to include the information of the position and direction of the unpurchased item arranged at the initial position and the item ID, and stores the space data under creation after edit in the storage unit 25.

The unpurchased item processing unit 222 maintains a state in which the unpurchased item is selected with respect to the unpurchased item arranged at the initial position. The space creator performs the new arrangement operation on the unpurchased item arranged at the initial position and in the selected state by using the operating unit 24. The new arrangement operation is an operation of determining the arrangement position or direction of the unpurchased item selected by the new item selecting operation in the virtual reality space, and is an operation of changing the arrangement position or direction of the unpurchased item arranged at the initial position to a desired position or direction of the space creator. The space creator can also have the desired position or direction the same as the initial position.

When the new arrangement operation is performed by the space creator, the unpurchased item processing unit 222 edits the space data under creation stored in the storage unit 25 so that the item is arranged in the virtual reality space at the position and direction indicated by the item processing information by using the acquired three-dimensional data of the item on the basis of the item processing information indicating the new arrangement operation. The unpurchased item processing unit 222 edits the space data under creation so as to include the information of the position and direction of the item arranged in the virtual reality space by the new arrangement operation and the item ID, and stores the space data under creation after edit in the storage unit 25.

The unpurchased item processing unit 222 transmits the item processing information to the space creation server 4. As described above, the transmission of the item processing information from the unpurchased item processing unit 222 to the space creation server 4 is performed, for example, at a timing when it is determined that each item processing operation is temporarily ended or at a predetermined time interval.

Note that after arranging the selected unpurchased item at the initial position, the unpurchased item processing unit 222 may cancel the state in which the unpurchased item is selected and temporarily confirm the arrangement position.

The unpurchased item processing unit 222 can arrange the unpurchased item in the virtual reality space by changing the arrangement direction or the position of the unpurchased item on the basis of the item processing information indicating the operation of changing the arrangement position or direction of the unpurchased item.

For example, the space creator may want to change the arrangement position or direction of the selected unpurchased item after determining the arrangement position or direction of the selected unpurchased item by the new arrangement operation. In addition, as described above, after arranging the selected unpurchased item at the initial position, the unpurchased item processing unit 222 may cancel the state in which the unpurchased item is selected and temporarily confirm the arrangement position.

The unpurchased item processing unit 222 enables the space creator to select an unpurchased item with respect to the unpurchased item whose arrangement position or direction has been confirmed once and change the arrangement position or direction of the unpurchased item.

Note that, when the space creator leaves the virtual reality space, the unpurchased item processing unit 222 deletes all the unpurchased items arranged in the virtual reality space by the space creator. At that time, the registration of all the unpurchased items is deleted from the purchase cart to be described later. Furthermore, in a case where the joint editing is performed, when a certain participant (space creator) leaves the virtual reality space, the unpurchased item processing unit 222 deletes all the unpurchased items that the participant has arranged in the virtual reality space and that the participant has not purchased. At that time, the registration of all the unpurchased items is deleted from the purchase cart described later of the participant.

(Purchase Unit)

The purchase unit 223 executes purchase processing of an unpurchased item on the basis of purchase operation information indicating a purchase operation of an unpurchased item performed after arrangement in the virtual reality space. In addition, the purchase unit 223 may execute the purchase processing of a plurality of types of unpurchased items on the basis of selecting operation information indicating the selecting operation of selecting a plurality of types of unpurchased items arranged in the virtual reality space and the purchase operation information.

Since the information processing apparatus 2 includes the acquisition unit 221 and the unpurchased item processing unit 222, the space creator can arrange an unpurchased item selected by the space creator in the virtual reality space. In addition, since the information processing apparatus 2 includes the unpurchased item processing unit 222, the space creator can confirm a state in which the unpurchased item is arranged in the virtual reality space while changing the arrangement position or direction of the unpurchased item for which the arrangement position or direction has been confirmed. Therefore, the space creator can determine whether or not it is necessary to purchase the unpurchased item after confirming the state in which the unpurchased item is arranged in the virtual reality space.

In a case where the space creator determines to purchase the unpurchased item after confirming the state in which the unpurchased item is arranged in the virtual reality space, the space creator can perform a purchase operation for purchasing the unpurchased item using the operating unit 24.

In the space creation screen, for example, an item purchase button is displayed. When the item purchase button is operated by the space creator, an item purchase screen is displayed. On the item purchase screen, for example, simple display data of one or more types of unpurchased items arranged in the virtual reality space when the item purchase button is operated is displayed in a list, or a character string indicating item names of one or more types of unpurchased items is displayed in a list. The item price of each unpurchased item may be displayed on the item purchase screen. In addition, for example, a purchase execution button is displayed on the item purchase screen.

The space creator performs a selecting operation of an item to be purchased by selecting one or more types of simple display data or item names from among the simple display data or item names of one or more types of unpurchased items listed on the item purchase screen using the operating unit 24, and then operates the purchase execution button.

Furthermore, the information processing apparatus 2 may display a purchase execution button in the space creation screen when a selecting operation of an unpurchased item arranged in the virtual reality space is performed in the space creation screen. The space creator performs a selecting operation of an unpurchased item to be purchased and operates a purchase execution button.

Note that, in a case where the joint editing is performed, only unpurchased items newly arranged by a participant (space creator) are displayed in a list on the item purchase screen displayed by an operation of the participant.

The purchase operation includes an operation of specifying which unpurchased item is to be purchased and an operation of instructing purchase of the specified unpurchased item. In the example of the item purchase screen, the purchase operation includes a selecting operation of an item from the list display and an operation of the purchase execution button. Furthermore, in the above example of performing the selecting operation of the unpurchased item arranged in the virtual reality space, the purchase operation includes a selecting operation of an unpurchased item arranged in the virtual reality space and an operation of the purchase execution button.

The information processing apparatus 2 generates the selecting operation information when the space creator performs a selecting operation of an unpurchased item, and generates the purchase operation information including the selecting operation information when the space creator performs the purchase operation. The purchase operation information includes the item IDs of one or more types of unpurchased items indicated by the selecting operation information, and information indicating that purchase execution has been performed.

When the purchase operation information is generated in the information processing apparatus 2, the purchase unit 223 executes purchase processing. The purchase processing is processing of generating the purchase processing information of the basis of the purchase operation information and transmitting the generated purchase processing information to the item management server 3. The purchase unit 223 includes at least the item ID of the unpurchased item to be purchased and the space creator ID of the space creator who has performed the purchase operation in the purchase processing information. In addition, the purchase unit 223 may include information of an item price of the unpurchased item to be purchased in the purchase processing information. For example, the information processing apparatus 2 directly transmits the purchase processing information to the item management server 3, or transmits the purchase processing information to the item management server 3 via the space creation server 4.

The space creator can perform the purchase processing at any timing. When the space creator exits from the virtual reality space, the information processing apparatus 2 may confirm the presence or absence of purchase intention with the space creator by displaying a message inquiring about the presence or absence of purchase intention, displaying the above-described item purchase screen, or the like. In addition, the information processing apparatus 2 may confirm the presence or absence of purchase intention with the space creator by a method similar to as described above after a certain period of time has elapsed since the unpurchased item is arranged in the virtual reality space.

Upon acquiring the purchase processing information from the information processing apparatus 2, the item management server 3 cooperates with, for example, an external settlement service system to execute settlement processing. Upon completion of the settlement processing, the item management server 3 transmits, to the information processing apparatus 2, a purchased notification indicating that the pay item indicated by the item ID included in the settlement processing information has become a purchased item purchased by the space creator indicated by the space creator ID included in the purchase processing information. Upon acquiring the purchased notification, the purchase unit 223 outputs the purchased notification to the purchased item processing unit 224.

(Purchased Item Processing Unit)

After the purchase processing of the unpurchased item, the purchased item processing unit 224 executes purchased item arrangement processing of arranging the purchased item that is a purchased pay item in the virtual reality space.

The purchased item arrangement process is a process including, for at least a pay item arranged in the virtual reality space as an unpurchased item, after the purchase processing of the pay item, storing information such as a flag indicating that the pay item is a purchased item in the storage unit 25 in association with the item ID of the pay item, and arranging the pay item in the virtual reality space.

Upon acquiring the purchased notification from the purchase unit 223, the purchased item processing unit 224 arranges the pay item indicated by the item ID included in the purchase processing information, that is, the pay item arranged in the virtual reality space as the unpurchased item in the virtual reality space as the purchased item. The position where the purchased item processing unit 224 arranges the purchased item is the same position as the arrangement position of the pay item arranged in the virtual reality space as the unpurchased item.

As described later, in a case where a pay item that has already been arranged in the virtual reality space as an unpurchased item has been deleted since a preset time has elapsed after arrangement of the unpurchased item, the purchased item processing unit 224 arranges the pay item as a purchased item, for example, at a position designated by the space creator.

The purchased item processing unit 224 transmits the item processing information to the space creation server 4. As described above, the transmission of the item processing information from the purchased item processing unit 224 to the space creation server 4 is performed, for example, at a timing when it is determined that each item processing operation is temporarily ended or at a predetermined time interval.

Processing in the unpurchased item processing unit 222, the purchase unit 223, and the purchased item processing unit 224 in a case where the acquisition unit 221 determines that the item selected by the new item selecting operation performed by the space creator is a pay item that has not been purchased by the space creator, that is, an unpurchased item is as described above.

On the other hand, in a case where the acquisition unit 221 determines that the item selected by the new item selecting operation performed by the space creator is a free item, or in a case where the space creator determines that the item is a purchased pay item, that is, a purchased item, the information processing apparatus 2 can perform the following arrangement processing by the purchased item processing unit 224, for example. In a case where the item selected by the new item selecting operation is a free item or a purchased item, the information processing apparatus 2 can handle the items equally in processing of newly arranging each item in the virtual reality space.

In a case where it is determined that the item selected by the new item selecting operation performed by the space creator is a free item, or in a case where it is determined that the item selected is a pay item purchased by the space creator, that is, a purchased item, the acquisition unit 221 outputs the item ID of the selected free item or the item ID of the selected purchased item to the purchased item processing unit 224.

Upon acquiring the item ID from the acquisition unit 221, the purchased item processing unit 224 acquires the three-dimensional data of the free item or the purchased item stored in association with the item ID from the storage unit 25. Upon acquiring the three-dimensional data of the selected free item or the selected purchased item, the purchased item processing unit 224 first uses the three-dimensional data to edit the space data under creation stored in the storage unit 25 so that the free item or the purchased item is arranged at the initial position in the virtual reality space. The initial position may be, for example, a position determined in advance and stored in the storage unit 25, or may be a position determined according to the position of the avatar of the space creator who has performed the new item selecting operation. The position corresponding to the position of the avatar is, for example, a position separated from the position of the avatar by a predetermined distance in the line-of-sight direction of the avatar. The setting of the initial position in the information processing apparatus 2 is the same as the setting of the initial position in the space creation server 4.

The purchased item processing unit 224 edits the space data under creation so as to include the information of the position and direction of the free item or the purchased item arranged at the initial position and the item ID, and stores the space data under creation after edit in the storage unit 25.

The purchased item processing unit 224 maintains a state in which the free item or the purchased item is selected for the free item or the purchased item arranged at the initial position. The space creator performs a new arrangement operation on the free item or the purchased item arranged at the initial position and in the selected state.

When the new arrangement operation is performed by the space creator, the purchased item processing unit 224 edits the space data under creation stored in the storage unit 25 so that the free item or the purchased item is arranged in the virtual reality space at the position and direction indicated by the item processing information by using the acquired three-dimensional data of the item on the basis of the item processing information indicating the new arrangement operation. The purchased item processing unit 224 edits the space data under creation so as to include the information of the position and direction of the free item or the purchased item arranged in the virtual reality space by the new arrangement operation and the item ID, and stores the space data under creation after edit in the storage unit 25.

Note that after arranging the selected free item or the selected purchased item at the initial position, the purchased item processing unit 224 may cancel the state in which the free item or the purchased item is selected and temporarily confirm the arrangement position.

The unpurchased item processing unit 222 can make the mode of arrangement of the unpurchased item different from the mode of arrangement of the purchased item that is a purchased pay item among the pay items.

When arranging an unpurchased item in the virtual reality space, the unpurchased item processing unit 222 can make the mode of arrangement of the unpurchased item different from a mode of arrangement when the purchased item is arranged in the virtual reality space.

Figure 3:
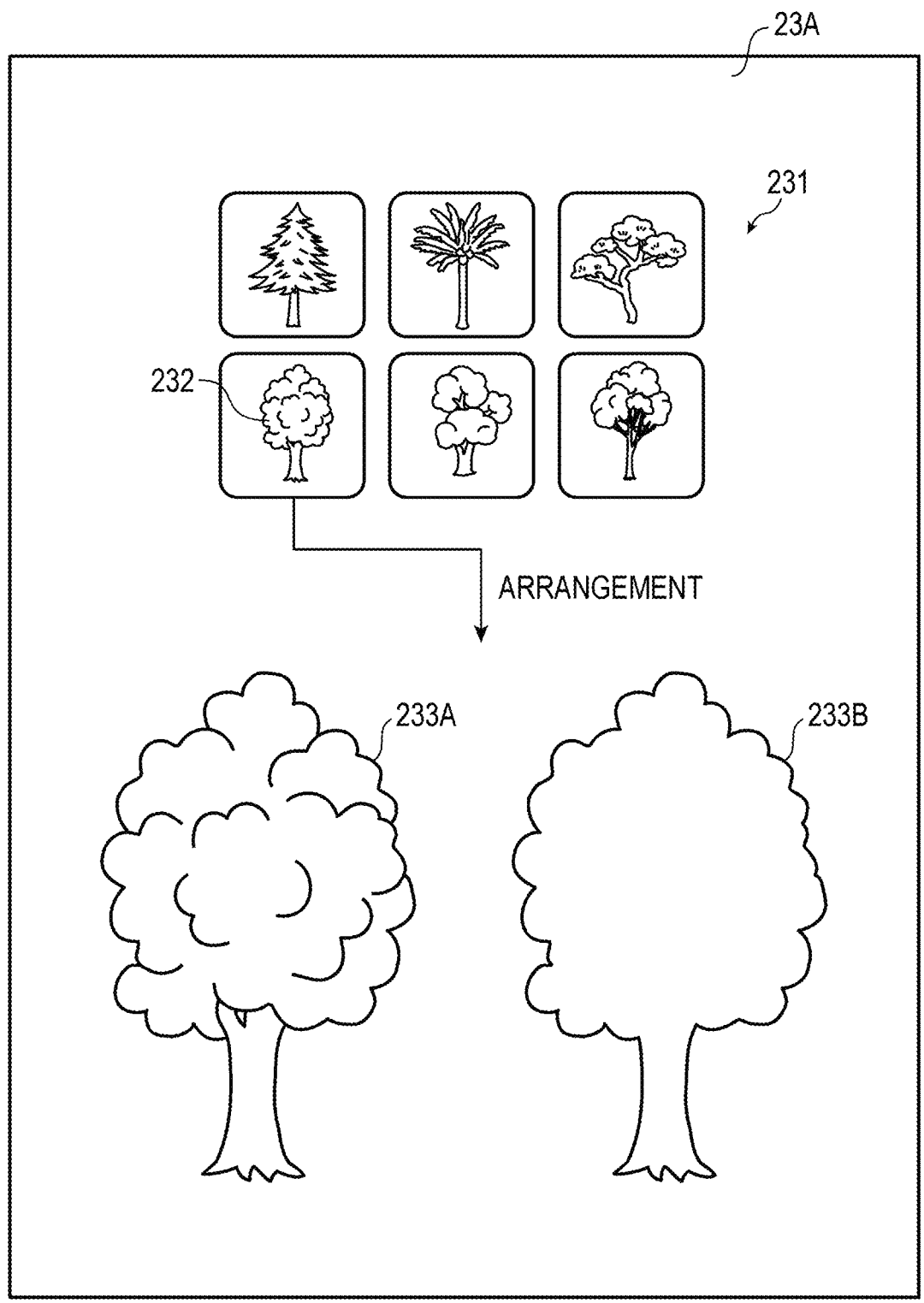
FIG. 3 is a screen view illustrating an example of a space creation screen.

FIG. 3 is a screen view illustrating an example of a space creation screen.

FIG. 3 illustrates a space creation screen 23A, an item list 231, a simple display 232 of pay items, and pay items 233A and 233B arranged in the virtual reality space.

For example, it is assumed that the pay item 233A arranged in the virtual reality space indicates the mode of arrangement of the pay item in a case where the space creator selects a purchased pay item by selecting the simple display 232 of the purchased pay item from the item list 231 and arranges the pay item in the virtual reality space by the new arrangement operation. That is, it is assumed that the pay item 233A is a purchased item. The pay item 233A, which is the purchased item, is arranged by the purchased item processing unit 224.

On the other hand, for example, it is assumed that the pay item 233B arranged in the virtual reality space indicates the mode of arrangement of the pay item in a case where the space creator selects an unpurchased pay item by selecting the simple display 232 of the unpurchased pay item from the item list 231 and arranges the unpurchased pay item in the virtual reality space by the new arrangement operation. That is, the pay item 233B is an unpurchased item. The pay item 233B that is an unpurchased item is arranged by the unpurchased item processing unit 222.

As illustrated in FIG. 3, even in a case where the same pay item indicated by the simple display 232 is selected, the modes of arrangement of the pay item 233A and the pay item 233B are different. Specifically, the pay item 233 and the pay item 233B have different appearances. Although the appearance of the pay item 233A, which is the purchased item, is the appearance of the original item and is expressed in detail, the appearance of the pay item 233B, which is the unpurchased item, is not the same appearance as the appearance of the pay item 233A but is only an outline in which details are omitted.

It is useful for the space creator to determine whether or not it is necessary to purchase a pay item after confirming the state in which the pay item is arranged in the virtual reality space. On the other hand, in the virtual reality technology, the state of the virtual reality space in which the pay item is arranged is substantially the same regardless of whether the pay item is unpurchased or purchased. Therefore, simply making the unpurchased item available to the space creator is not preferable for the item provider of the pay item. This is because, for example, if the space creator can create the virtual reality space using the unpurchased item without any limitation, the motivation for the space creator to purchase the pay item would be lost. Thus, regarding the use of the unpurchased item by the space creator, it is necessary to consider a balance of interests between the space creator and the item provider.

In the information processing apparatus 2 of the present embodiment, the unpurchased item processing unit 222 makes the mode of arrangement of the unpurchased item different from the mode of arrangement of the purchased item, so that a certain restriction can be added to the mode of use of the unpurchased item, and the balance of interests between the space creator and the item provider can be adjusted.

In order to make the mode of arrangement of the unpurchased item different from the mode of arrangement of the purchased item, the unpurchased item processing unit 222 may change the mode of arrangement of the unpurchased item when a preset time elapses after arranging the unpurchased items in the virtual reality space.

For example, it is assumed that, in FIG. 3, the pay item 233A arranged in the virtual reality space indicates the mode of arrangement of the pay item in a case where the space creator selects a purchased pay item by selecting the simple display 232 of the purchased pay item from the item list 231 and arranges the pay item in the virtual reality space by the new arrangement operation. That is, it is assumed that the pay item 233A is a purchased item. The pay item 233A, which is the purchased item, is arranged by the purchased item processing unit 224.

On the other hand, for example, it is assumed that the pay item 233B arranged in the virtual reality space indicates the mode of arrangement of the pay item in a case where a preset time has elapsed after the space creator selects an unpurchased pay item by selecting the simple display 232 of the unpurchased pay item from the item list 231 and arranges the unpurchased pay item in the virtual reality space by the new arrangement operation. That is, the pay item 233B is an unpurchased item. The pay item 233B that is an unpurchased item is arranged by the unpurchased item processing unit 222.

As illustrated in FIG. 3, even in a case where the same pay item indicated by the simple display 232 is selected, the modes of arrangement of the pay item 233A and the pay item 233B are different. Specifically, the pay item 233 and the pay item 233B have different appearances.

When arranging the pay item 233B that is an unpurchased item in the virtual reality space, the unpurchased item processing unit 222 sets the initial appearance of the pay item 233B to the same appearance as the pay item 233A. However, when the preset time elapses after arrangement of the pay item 233B in the virtual reality space, the unpurchased item processing unit 222 changes the appearance of the pay item 233B that is an unpurchased item to the appearance of only the outline as illustrated in FIG. 3.

The preset time can be arbitrarily set. The preset time may be, for example, about one to ten minutes, or may be a time of any other length. In a case where the arrangement mode of the unpurchased item is changed, the unpurchased item processing unit 222 transmits the item ID of the unpurchased item whose mode of arrangement has been changed, information indicating the arrangement position of the unpurchased item, and information indicating the changed mode to the space creation server 4.

Also in this case, the unpurchased item processing unit 222 can add a certain restriction to the mode of use of the unpurchased item by making the mode of arrangement of the unpurchased item different from the mode of arrangement of the purchased item.

In order to make the mode of arrangement of the unpurchased item different from the mode of arrangement of the purchased item, the unpurchased item processing unit 222 may make the mode of arrangement of the unpurchased item different between a mode of arrangement of the unpurchased item viewed by a participant who does not have the editing authority of the virtual reality space and a mode of arrangement of the unpurchased item viewed by a participant who has the editing authority of the virtual reality space.

As described above, the space creation server 4 may allow a general participant who is a participant who does not have the editing authority of the virtual reality space to participate in the virtual reality space under creation via the network 7 using the participation terminal 6A or the participation terminal 6B.

Even in a case where the general participant participates in the virtual reality space under creation, if the unpurchased item is simply made available to the space creator, for the general participant, both the unpurchased item and the purchased item arranged in the virtual reality space look the same as the virtual reality space, which is not preferable for the item provider of the pay item.

For example, it is assumed that, in FIG. 3, the pay item 233A arranged in the virtual reality space indicates the mode of arrangement of the pay item in a case where the space creator selects a purchased pay item by selecting the simple display 232 of the purchased pay item from the item list 231 and arranges the pay item in the virtual reality space by the new arrangement operation. That is, it is assumed that the pay item 233A is a purchased item. The pay item 233A, which is the purchased item, is arranged by the purchased item processing unit 224.

On the other hand, for example, it is assumed that the pay item 233B arranged in the virtual reality space indicates the mode of arrangement of the pay item in a case where the space creator selects an unpurchased pay item by selecting the simple display 232 of the unpurchased pay item from the item list 231 and arranges the unpurchased pay item in the virtual reality space by the new arrangement operation. That is, the pay item 233B is an unpurchased item. The pay item 233B that is an unpurchased item is arranged by the unpurchased item processing unit 222.

As illustrated in FIG. 3, even in a case where the same pay item indicated by the simple display 232 is selected, the modes of arrangement of the pay item 233A and the pay item 233B are different. Specifically, the pay item 233 and the pay item 233B have different appearances.

The general participant accesses the space data under creation managed by the space creation server 4 using the participation terminal 6A or the participation terminal 6B, and participates in the virtual reality space represented by the space data under creation. The unpurchased item processing unit 222 determines the mode of arrangement of the unpurchased item in a case where the general participant browses the unpurchased item, and transmits the mode of arrangement to the space creation server 4.

In a case where the space creator, that is, the participant having the editing authority of the virtual reality space participates in the virtual reality space using the information processing apparatus 2, the unpurchased item processing unit 222 makes the appearance of the pay item 233B the same as the appearance of the pay item 233A. On the other hand, in a case where the general participant participates in the virtual reality space using the participation terminal 6A or the participation terminal 6B, the unpurchased item processing unit 222 changes the appearance of the pay item 223B to the appearance of only the outline as illustrated in FIG. 3.

Also in this case, the unpurchased item processing unit 222 can add a certain restriction to the mode of use of the unpurchased item by making the mode of arrangement of the unpurchased item different from the mode of arrangement of the purchased item.

As the mode of arrangement of the unpurchased items different from the mode of arrangement of the purchased items, various modes other than the above-described modes may be employed.

For example, the unpurchased item processing unit 222 may arrange the unpurchased item by making the appearance of the unpurchased item lighter in color than the appearance of the purchased item, arrange the unpurchased item by making the appearance of the unpurchased item different in color from the appearance of the purchased item, arrange the unpurchased item by making the appearance of the unpurchased item translucent while the appearance of the purchased item is opaque, arrange the unpurchased item by making the appearance of the unpurchased item a blurred appearance of the purchased item, arrange characters, a symbol, or the like indicating that it is an unpurchased item near the unpurchased item, or make the color of the frame displayed along the outer shape of the item different between the unpurchased item and the purchased item when the item is right in front of the avatar.

In addition, for example, the unpurchased item processing unit 222 may make the appearance of the unpurchased item lighter in color than the appearance of the purchased item, make the appearance of the unpurchased item different in color from the appearance of the purchased item, make the appearance of the unpurchased item translucent while the appearance of the purchased item is opaque, make the appearance of the unpurchased item a blurred appearance of the purchased item, arrange characters, a symbol, or the like indicating that it is an unpurchased item near the unpurchased item, or delete the unpurchased item when a preset time elapses after arranging the unpurchased item in the virtual reality space.

Furthermore, for example, after arranging the unpurchased item in the virtual reality space, the unpurchased item processing unit 222 may make the appearance of the unpurchased item lighter in color than the appearance of the purchased item in stages or gradually with the lapse of time, make the appearance of the unpurchased item different in color from the appearance of the purchased item in stages or gradually, increase the transparency of the appearance of the unpurchased item in stages or gradually while the appearance of the purchased item is opaque, or making the appearance of the unpurchased item an appearance of the purchased item that is blurred in stages or gradually strongly.

Note that, in a case where the unpurchased item processing unit 222 makes the appearance of the unpurchased item different from the appearance of the purchased item, the unpurchased item processing unit 222 can process the three-dimensional data of the item acquired from the item management server 3 and stored in the storage unit 25 to obtain three-dimensional data having different appearances. In addition, in a case where the item management server 3 manages three-dimensional data for unpurchased items having different appearances from appearances of purchased items, and an unpurchased item is newly arranged, the acquisition unit 221 may acquire the three-dimensional data for the unpurchased item.

When the first participant having the editing authority of the virtual reality space arranges the unpurchased item, the unpurchased item processing unit 222 arranges the unpurchased item in the virtual reality space in a mode browsable by the first participant and the second participant having the editing authority of the virtual reality space.

As described above, the space creation server 4 may allow a certain space creator, in other words, the first participant having the editing authority and another space creator different from the first participant, in other words, the second participant, which is another participant having the editing authority, to participate in the virtual reality space under creation via the network 7 and jointly edit the space data under creation using another space creation terminal. That is, the space creation server 4 may enable a plurality of space creators (a plurality of participants) having editing authority to jointly edit the same space data under creation.

In a case where both the first participant and the second participant participate in the virtual reality space under creation and perform joint editing, there is a possibility that efficient editing cannot be performed unless the other participant can view the item arranged by one participant. For example, in a case where two items are arranged in the virtual reality space, usually, the two items cannot be arranged at a position where spaces occupied by the respective items overlap. In a case where the other participant cannot view the item arranged by one participant, the other participant cannot visually confirm the position where the other participant can arrange the item, and thus the other participant cannot efficiently arrange the item. In addition, if the other participant cannot view the item arranged by one participant, there is a possibility that the first participant and the second participant cannot feel a sense of editing together. In addition, when the other participant can view the item arranged by one participant, the other participant can confirm a state in which the unpurchased item is arranged in the virtual reality space, and thus it is also useful for determination of purchase by the other participant.

Therefore, in a case where the first participant arranges the item, the information processing apparatus 2 arranges the item in the virtual reality space in a mode browsable by both the first participant and the second participant. The same applies to the unpurchased item, and in a state where the joint editing is performed, the unpurchased item processing unit 222 arranges the unpurchased item in the mode browsable by both the first participant and the second participant even in a case where the first participant arranges the unpurchased item.

Note that, for example, in a case where there are two participants having the editing authority, which of the participants is the first participant or the second participant is not specified. Arranging by the unpurchased item processing unit 222 of the unpurchased item in the mode browsable by the first participant and the second participant when the first participant arranges the unpurchased item means that the unpurchased item processing unit 222 arranges the unpurchased item in a mode browsable by both participants in a case where one of the participants arranges the unpurchased item.

In addition, arranging by the unpurchased item processing unit 222 of the unpurchased item in the mode browsable by the first participant and the second participant when the first participant arranges the unpurchased item means, for example, that the unpurchased item processing unit 222 arranges the unpurchased item in a mode browsable by all the participants in a case where any participant arranges the unpurchased item in a state where there is a plurality of participants having the editing authority.

In a case where the first participant arranges the unpurchased item, the unpurchased item processing unit 222 may arrange the unpurchased item in the mode browsable by the first participant and the second participant, and the mode of arrangement of the unpurchased item may be different from the mode of arrangement of the purchased item. In this case, both the first participant and the second participant browse the mode of arrangement of the unpurchased items as being different from the mode of arrangement of the purchased items.

In addition, in a case where the position changing operation or the direction changing operation by the first participant is performed on the unpurchased item as an existing item, the unpurchased item processing unit 222 can change the position or direction of the unpurchased item. In this case, both the first participant and the second participant browse the arrangement position or direction of the unpurchased item as being changed.

(Modification (1) of Information Processing System 1)

Next, a modification of the information processing system according to the first embodiment will be described.

Figure 4:
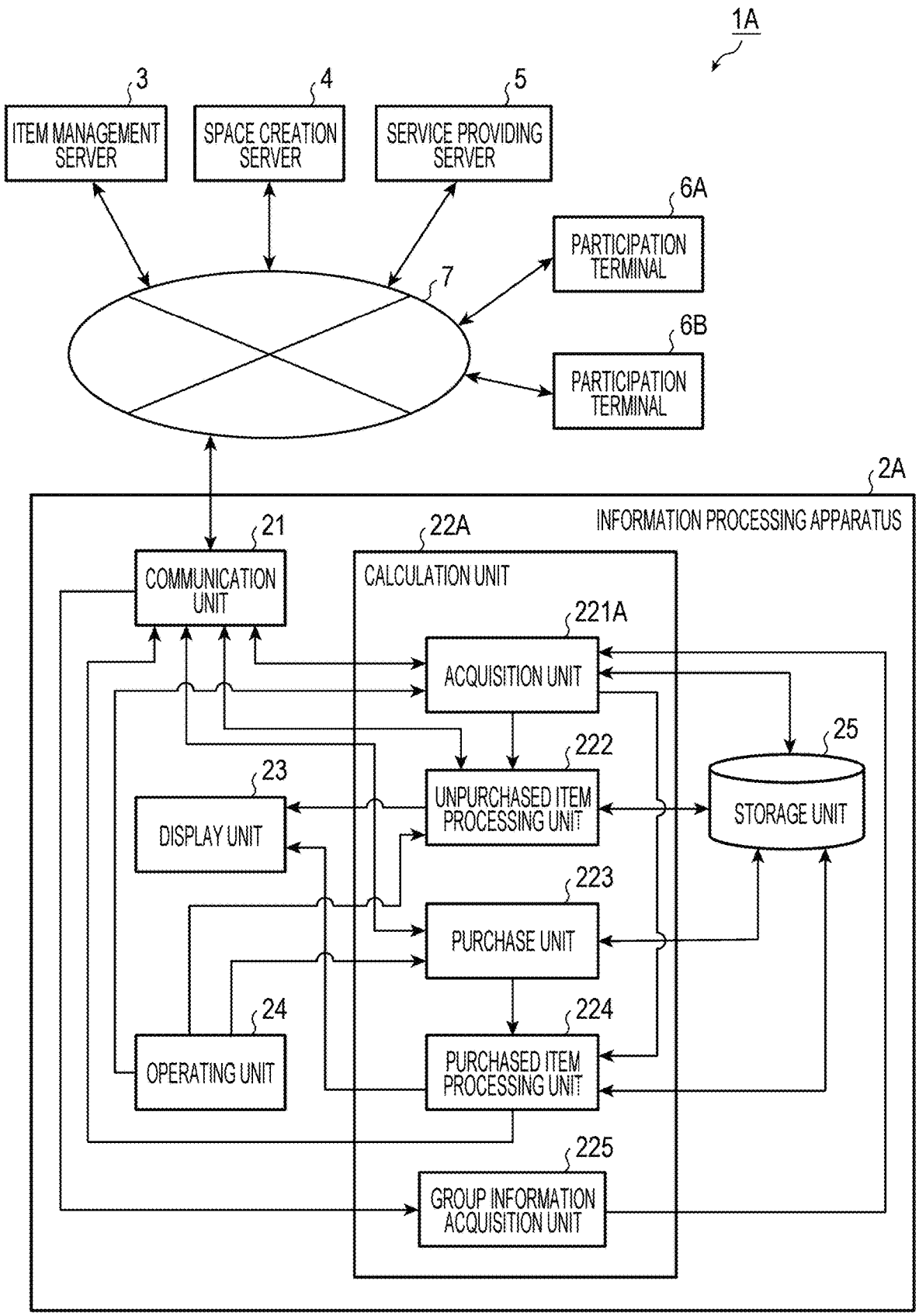
FIG. 4 is a block diagram illustrating a configuration of Modification (1) of the information processing system according to the first embodiment.

FIG. 4 is a block diagram illustrating a configuration of an information processing system 1A that is Modification (1) of the information processing system 1. As illustrated in FIG. 4, the information processing apparatus 2A includes the communication unit 21, a calculation unit 22A, the display unit 23, the operating unit 24, and the storage unit 25.

The calculation unit 22A controls the overall operation of the information processing apparatus 2A. The calculation unit 22A includes an acquisition unit 221A, the unpurchased item processing unit 222, the purchase unit 223, the purchased item processing unit 224, and a group information acquisition unit 225. By the calculation unit 22A executing the information processing application, functions of the acquisition unit 221A, the unpurchased item processing unit 222, the purchase unit 223, the purchased item processing unit 224, and the group information acquisition unit 225 are implemented.

The group information acquisition unit 225 acquires group information, which is information of a group to which each participant belongs, for a plurality of participants having the editing authority of the virtual reality space.

As described above, the space creation server 4 may enable a plurality of participants having the editing authority of the virtual reality space to jointly edit the same space data under creation. The plurality of participants may form a group to which all or part of the plurality of participants belong. All the plurality of participants belonging to the same group can use even a purchased item purchased by only one of the plurality of participants for creating the virtual reality space as a purchased item purchased by himself or herself.

In addition, as described above, regarding the use of the unpurchased item by the space creator, it is necessary to consider a balance of interests between the space creator and the item provider. If each participant cannot use a certain pay item as a purchased item without purchasing the pay item by himself or herself in a case where a plurality of persons participate in joint editing, there is a possibility that the profit is excessively biased to the item provider. On the other hand, by handling the pay item by the plurality of participants belonging to the same group as described above, the balance of interests between the space creator (participant) and the item provider can be adjusted.

The group information is managed by, for example, the item management server 3. The group information identifying a certain group includes information identifying the group and the space creator IDs of the plurality of participants belonging to the group. The information for identifying the group is, for example, an ID (hereinafter referred to as "group ID") unique to each group. The group ID is expressed by, for example, a character string. The group information is created by any participant performing an operation using the information processing apparatus 2A, for example, and is transmitted to the item management server 3. The item management server 3 stores the group information acquired from the information processing apparatus 2A in the storage device for the item management server.

The group information acquisition unit 225 acquires the group information from the item management server 3 via, for example, the space creation server 4. The processing by the group information acquisition unit 225 may be performed as one process of the pre-processing by the information processing apparatus 2A, or may be performed in response to an operation of the space creator. When acquiring the group information, the group information acquisition unit 225 transmits, to the item management server 3, for example, the space creator ID input from the space creator for login in the pre-processing performed by the information processing apparatus 2A or the group ID input by the space creator for group information acquisition. The item management server 3 searches for a group including the acquired space creator ID or searches for a group of the acquired group ID, and transmits the group information of the searched group to the information processing apparatus 2A. The group information acquisition unit 225 outputs the acquired group information to the acquisition unit 221A.

Hereinafter, it is assumed that at least the first participant and the second participant belong to a certain group.

In a case where the acquisition unit 221A determines that the first participant and the second participant belong to the same group on the basis of the group information, with respect to the purchased item which is a pay item purchased by one of the first participant and the second participant, the acquisition unit 221A processes the purchased item arranged in the virtual reality space on the basis of the arrangement operation information indicating the arrangement operation of the purchased item by the first participant or the second participant as a purchased item purchased by the group.

Upon acquiring the group information from the group information acquisition unit 225, the acquisition unit 221A refers to the space creator ID included in the group information and determines which participant (space creator) belongs to the same group. Here, the acquisition unit 221A determines that the first participant and the second participant belong to the same group. For example, in a case where a purchased item purchased by the first participant is arranged in the virtual reality space on the basis of the determination result, the acquisition unit 221A processes the purchased item as a purchased item purchased by the group.

At the time of the above processing, for example, the acquisition unit 221A stores the group information in the storage unit 25, and stores the item ID of the purchased item arranged in the virtual reality space and the group ID in association with each other in the storage unit 25. Furthermore, in the above processing, the acquisition unit 221A stores the item ID of the purchased item arranged in the virtual reality space and the plurality of space creator IDs included in the group information in the storage unit 25 in association with each other.

By this processing, when the second participant belonging to the same group as the first participant selects an existing item by the existing item selecting operation, even if the selected existing item is a purchased item purchased only by the first participant, the acquisition unit 221A determines the selected existing item as a purchased item purchased by the second participant. Then, by this processing, the second participant belonging to the same group as the first participant becomes able to use even the purchased item that has been purchased only by the first participant for creation of the virtual reality space as the purchased item purchased by the second participant himself or herself.

For example, in a duplication process at the time of joint editing as described later, it is determined whether or not duplication is restricted depending on whether or not a pay item as an existing item is an item purchased by oneself. The acquisition unit 221A performs the above processing, so that a plurality of participants belonging to the same group can freely edit the space data under creation.

The information processing apparatus 2A may be capable of setting whether or not the above-described processing by the acquisition unit 221A can be performed by an operation of the space creator. For example, even in a case where the first participant and the second participant belonging to the same group jointly edit certain space data under creation, if the above-described processing by the unpurchased item processing unit 222A is set to be impossible, the first participant and the second participant can use only the purchased item purchased by each of them as the purchased item.

(Modification (2) of Information Processing System 1)

Figure 5:
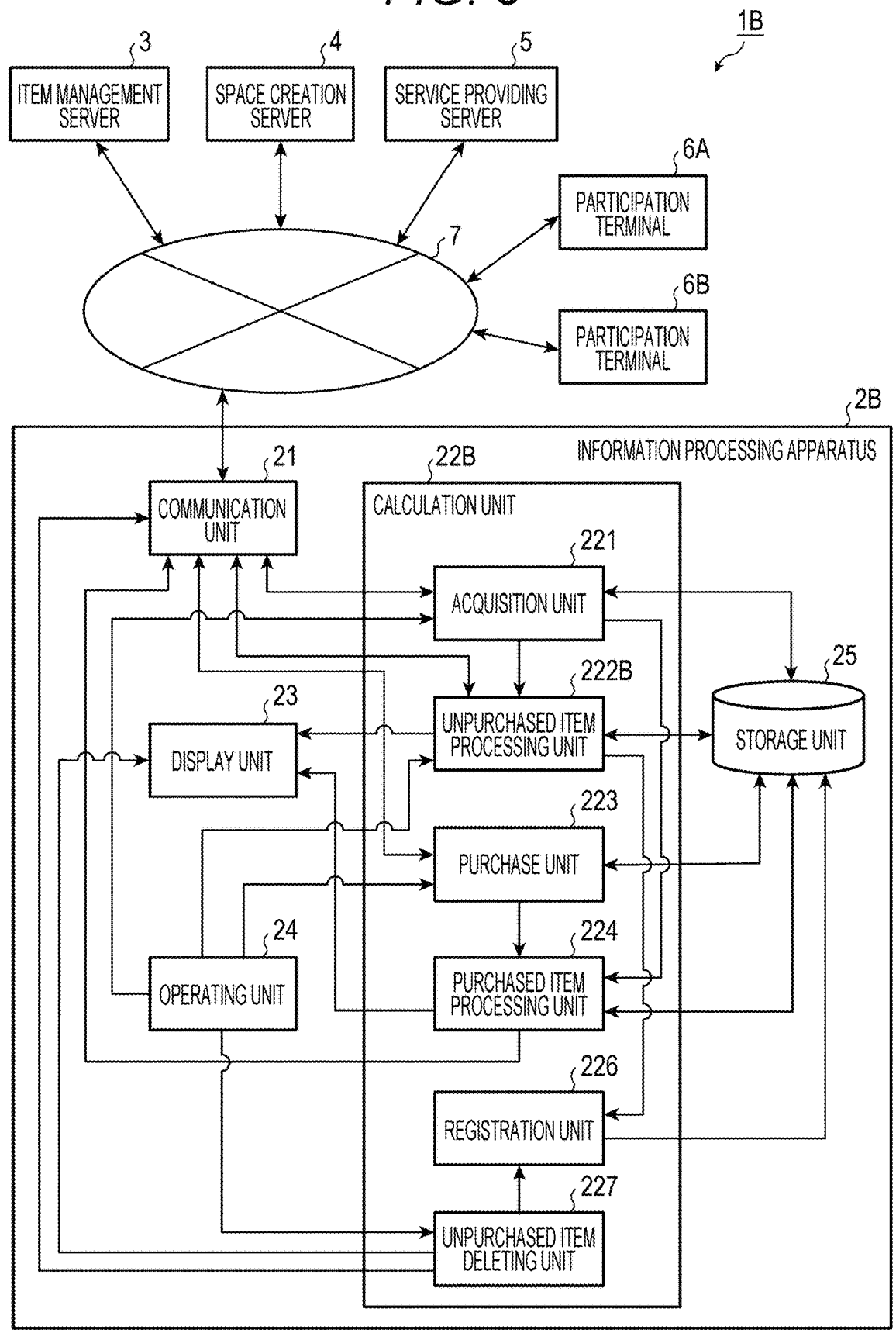
FIG. 5 is a block diagram illustrating a configuration of Modification (2) of the information processing system according to the first embodiment.

FIG. 5 is a block diagram illustrating a configuration of an information processing system 1B which is Modification (2) of the information processing system 1. As illustrated in FIG. 5, the information processing apparatus 2B includes the communication unit 21, a calculation unit 22B, the display unit 23, the operating unit 24, and the storage unit 25.

The calculation unit 22B controls the overall operation of the information processing apparatus 2B. The calculation unit 22B includes an acquisition unit 221, an unpurchased item processing unit 222B, a purchase unit 223, a purchased item processing unit 224, a registration unit 226, and an unpurchased item deleting unit 227. By the calculation unit 22B executing the information processing application, functions of the acquisition unit 221, the unpurchased item processing unit 222B, the purchase unit 223, the purchased item processing unit 224, the registration unit 226, and the unpurchased item deleting unit 227 are implemented.

When the unpurchased item processing unit 222B arranges an unpurchased item in the virtual reality space, the registration unit 226 registers the unpurchased item in the purchase cart.

The unpurchased item processing unit 222B can execute the unpurchased item arrangement processing and arrange the unpurchased item in the virtual reality space, similarly to the unpurchased item processing unit 222 described above. When arranging an unpurchased item in the virtual reality space, the unpurchased item processing unit 222B outputs the item processing information to the registration unit 226. Upon acquiring the item processing information, the registration unit 226 registers the unpurchased item in the purchase cart. The purchase cart is data including the item ID of an unpurchased item that the space creator is likely to purchase. The purchase cart includes, for example, a space creator ID of a space creator who arranges unpurchased items, and the item ID of one or more unpurchased items. The data of the purchase cart is stored in the storage unit 25, for example. Upon acquiring the item processing information, the registration unit 226 registers the unpurchased item in the purchase cart by including the item ID included in the item processing information in the data of the purchase cart.

Note that the purchase cart may be such that, by the space creator selecting the unpurchased item from the item list by an operation distinguished from the new arrangement operation, for example, the selected unpurchased item is registered. In this case, the space creator can manually register the unpurchased item in the purchase cart.

The information processing apparatus 2B according to the first embodiment can automatically register the unpurchased item in the purchase cart as the space creator arranges the unpurchased item by the above-described processing of the registration unit 226.

The unpurchased item arranged in the virtual reality space by the space creator is a pay item that the space creator may purchase. Nevertheless, if the space creator needs to manually register the unpurchased item in the purchase cart separately when the space creator actually intends to purchase the unpurchased item, efficiency is poor for the space creator. Furthermore, the space creator checks the state of arrangement in the virtual reality space, and may forget to register the unpurchased item in the purchase cart even if the unpurchased item is intended to be purchased. On the other hand, automatically registering the arranged unpurchased item in the purchase cart is more convenient for the space creator than manually registering the unpurchased item in the purchase cart separately from the arrangement operation of the unpurchased item.

For example, the space creator can operate the operating unit 24 at an arbitrary timing to display a purchase cart screen. Furthermore, when the space creator exits from the virtual reality space, the information processing apparatus 2B may confirm the presence or absence of purchase intention with the space creator by displaying a message inquiring about the presence or absence of purchase intention, displaying the purchase cart screen, or the like. In addition, the information processing apparatus 2 may confirm the presence or absence of purchase intention with the space creator by a method similar to as described above after a certain period of time has elapsed since the unpurchased item is arranged in the virtual reality space.

On the purchase cart screen, simple display data of one or more types of unpurchased items is displayed in a list form on the basis of the data of the purchase cart, or a character string indicating item names of one or more types of unpurchased items is displayed in a list form. The item price of each unpurchased item may be displayed on the purchase cart screen. In addition, for example, a purchase execution button is displayed on the purchase cart screen.

The space creator selects one or more types of simple display data or item names from among the simple display data or item names of one or more types of unpurchased items listed on the purchase cart screen to thereby perform a selecting operation of an item to be purchased, and then operates the purchase execution button. In this manner, the space creator can collectively purchase a plurality of types of unpurchased items by selecting a plurality of types of unpurchased items using the purchase cart screen.

The information processing apparatus 2B generates the selecting operation information when the space creator performs the selecting operation of one or more unpurchased items from the purchase cart screen, and generates the purchase operation information including the selecting operation information when the purchase operation using the purchase execution button is performed. The purchase operation information includes the item IDs of one or more types of unpurchased items indicated by the selecting operation information, and information indicating that purchase execution has been performed. The information processing apparatus 2B outputs the generated purchase operation information to the purchase unit 223. When acquiring the purchase operation information, the purchase unit 223 executes the purchase processing. In a case where the selecting operation information included in the purchase operation information includes the item IDs of a plurality of types of unpurchased items, the purchase unit 223 executes the purchase processing of a plurality of types of unpurchased items.

In a case where the joint editing is performed, the registration unit 226 generates the purchase cart for each space creator.

Furthermore, also in a case where the above-described group is formed, the registration unit 226 generates the purchase cart for each participant (space creator). For example, it is assumed that the first participant and the second participant belong to the same group and perform joint editing. In a case where the first participant newly arranges an unpurchased item in the virtual reality space, the registration unit 226 registers the unpurchased item only in the purchase cart of the first participant. The purchase cart of the first participant includes, for example, the space creator ID of the first participant and the item ID of one or more unpurchased items. Similarly, in a case where the second participant newly arranges an unpurchased item in the virtual reality space, the registration unit 226 registers the unpurchased item only in the purchase cart of the second participant. The purchase cart of the second participant includes, for example, the space creator ID of the second participant and the item ID of one or more unpurchased items. As described above, even in a case where a plurality of participants belong to the same group, the registration unit 226 generates the purchase cart for each participant.

For example, each participant can operate the operating unit 24 at an arbitrary timing to display the purchase cart screen based on the purchase cart of each participant. Furthermore, when the participant who uses the information processing apparatus 2 leaves the virtual reality space, each information processing apparatus 2 may confirm the presence or absence of purchase intention by displaying a message inquiring about the presence or absence of purchase intention, displaying the purchase cart screen based on the purchase cart of the participant, or the like. In addition, the information processing apparatus 2 may confirm the presence or absence of purchase intention with each participant by a method similar to as described above after a certain period of time has elapsed since the unpurchased item is arranged in the virtual reality space by each participant.

The unpurchased item deleting unit 227 deletes the unpurchased item arranged in the virtual reality space on the basis of deleting operation information indicating the deleting operation of an unpurchased item.

For example, after arranging the unpurchased item in the virtual reality space, the space creator may consider that the item is unnecessary and desired to be deleted. The unpurchased item deleting unit 227 enables the space creator to select the unpurchased item once arranged in the virtual reality space and delete the unpurchased item.

When the space creator operates the operating unit 24 and performs the deleting operation following the selecting operation of an unpurchased item arranged in the virtual reality space, the information processing apparatus 2B generates deleting operation information that is the item processing information indicating the deleting operation, and outputs the deleting operation information to the unpurchased item deleting unit 227. The deleting operation information includes the space creator ID of the space creator who has performed the deleting operation, the item ID of the item that is the target of the deleting operation, information indicating the arrangement position of the item that is the target of the deleting operation, and information indicating that the item processing operation is the deleting operation. Upon acquiring the deleting operation information, the unpurchased item deleting unit 227 edits the space data under creation stored in the storage unit 25 so that the unpurchased item identified by the information indicating the item ID and the arrangement position included in the deleting operation information is deleted.

The unpurchased item deleting unit 227 outputs the item processing information indicating the deleting operation to the registration unit 226. In addition, the unpurchased item deleting unit 227 transmits the item processing information indicating the deleting operation to the space creation server 4. As described above, the transmission of the item processing information from the unpurchased item deleting unit 227 to the space creation server 4 is performed, for example, at a timing when it is determined that each item processing operation is temporarily ended or at a predetermined time interval.

In a case where all the unpurchased items arranged in the virtual reality space are deleted, the registration unit 226 deletes the registration of the unpurchased items in the purchase cart.

Upon acquiring the item processing information indicating the deleting operation from the unpurchased item deleting unit 227, the registration unit 226 determines whether or not all the unpurchased items identified by the item ID included in the item processing information have been deleted from the virtual reality space. The space data under creation includes information indicating the item IDs and the arrangement positions of all items arranged in the virtual reality space. In the virtual reality space, a plurality of items of the same type may be arranged. That is, in the space data under creation, there is a plurality of item IDs that is the same item ID and has different pieces of information indicating associated arrangement positions.

The registration unit 226 determines whether or not the same item ID as the item ID included in the acquired item processing information indicating the deleting operation exists in the space data under creation. In a case of determining that the item ID does not exist in the space data under creation, the registration unit 226 determines that all the unpurchased items arranged in the virtual reality space have been deleted. In a case where the registration unit 226 determines that all the unpurchased items arranged in the virtual reality space have been deleted, the registration unit deletes the registration of the unpurchased item indicated by the item ID from the purchase cart. On the other hand, in a case where there is at least one of the item IDs in the space data under creation, the registration unit 226 ends the processing without any change with respect to the purchase cart.

In a case where the joint editing is performed, the registration unit 226 determines, for each participant, whether or not all the unpurchased items arranged in the virtual reality space have been deleted.

In a case where the joint editing is performed, the space data under creation includes a space creator ID indicating which participant newly arranges the item, in addition to the information indicating the item IDs and the arrangement positions of all the items arranged in the virtual reality space. Before deleting the unpurchased item, the unpurchased item deleting unit 227 refers to the space data under creation, acquires the space creator ID indicating which participant newly arranges the deleted unpurchased item, and then deletes the unpurchased item. Thereafter, the unpurchased item deleting unit 227 outputs the acquired space creator ID to the registration unit 226 in addition to the item processing information indicating the deleting operation.

In the virtual reality space, a plurality of items of the same type may be arranged by the same participant. The registration unit 226 determines whether or not the item ID that is associated with the acquired space creator ID and is the same as the item ID included in the acquired item processing information exists in the space data under creation. In a case where the registration unit 226 determines that the item ID does not exist in the space data under creation, the registration unit 226 determines that all the unpurchased items arranged in the virtual reality space by the participant indicated by the space creator ID have been deleted. In a case where the registration unit 226 determines that all the unpurchased items arranged in the virtual reality space by a certain participant have been deleted, the registration unit deletes the registration of the unpurchased item indicated by the item ID from the purchase cart of the participant. On the other hand, in a case where there is at least one of the item IDs in the space data under creation, the registration unit 226 ends the processing without any change with respect to the purchase cart.

For example, an item deletion button may be displayed on the purchase cart screen. The space creator can select one or more types of simple display data or item names from among the simple display data or item names of one or more types of unpurchased items listed on the purchase cart screen to thereby perform a selecting operation of an item to be purchased, and then operate the delete button. When the display of one or more types of unpurchased items is deleted from the purchase cart screen by the operation of the space creator, the information processing apparatus 2B generates the deleting operation information and outputs the generated deleting operation information to the unpurchased item deleting unit 227. On the basis of the space creator ID of the space creator included in the deleting operation information and the item ID of the item to be the target of the deleting operation, the unpurchased item deleting unit 227 deletes all the unpurchased items arranged in the virtual reality space and indicated by the item ID and associated with the space creator ID. In this manner, the space creator can collectively delete the unpurchased items arranged in the virtual reality space by selecting and deleting the unpurchased items from the purchase cart screen.

The unpurchased item processing unit 222B changes the mode of arrangement of the unpurchased item when a preset time elapses after arranging the unpurchased item in the virtual reality space.

In order to make the mode of arrangement of the unpurchased item different from the mode of arrangement of the purchased item, the unpurchased item processing unit 222B may change the mode of arrangement of the unpurchased item when the preset time elapses after arranging the unpurchased item in the virtual reality space, similarly to the unpurchased item processing unit 222 described above.

The registration unit 226 may maintain the registration of the unpurchased items in the purchase cart even after the mode of arrangement of the unpurchased items is changed by the unpurchased item processing unit 222B. For example, even in a case where the unpurchased items are deleted by the unpurchased item processing unit 222B after the preset time has elapsed, and all the unpurchased items of the same type are thereby deleted, registration of the unpurchased items in the purchase cart may be maintained. In this case, the registration unit 226 may include the unpurchased items all deleted from the virtual reality space in the list display on the purchase cart screen, and perform display to indicate that all the unpurchased items have been deleted from the virtual reality space.

In addition, the registration unit 226 may delete the registration of the unpurchased items in the purchase cart in a case where the unpurchased items are deleted after the preset time elapses by the unpurchased item processing unit 222B and all the unpurchased items of the same type are thereby deleted.

(Modification (3) of Information Processing System 1)

Figure 6:
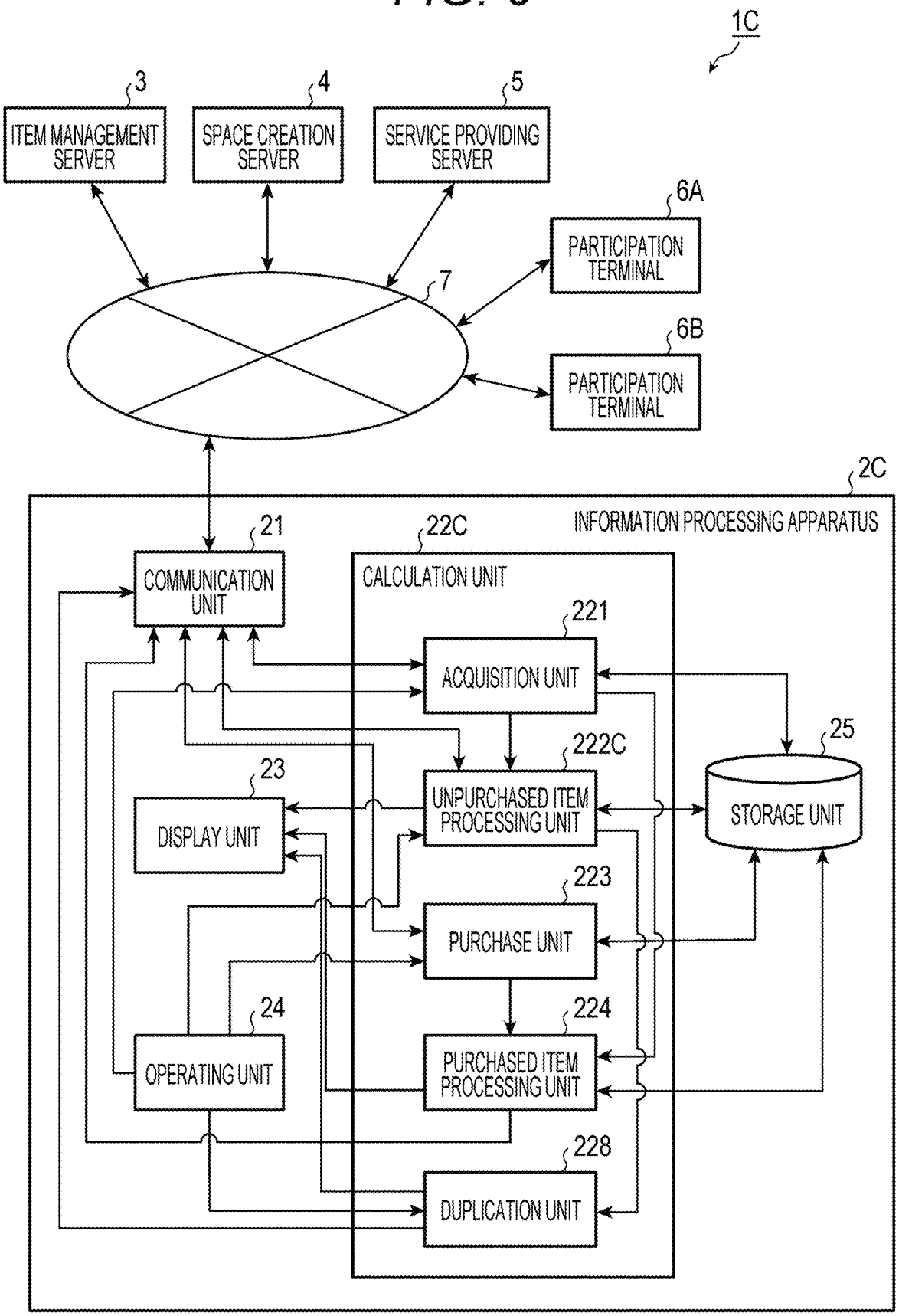
FIG. 6 is a block diagram illustrating a configuration of Modification (3) of the information processing system according to the first embodiment.

FIG. 6 is a block diagram illustrating a configuration of an information processing system 1C which is Modification (3) of the information processing system 1. As illustrated in FIG. 6, the information processing apparatus 2C includes the communication unit 21, a calculation unit 22C, the display unit 23, the operating unit 24, and the storage unit 25.

The calculation unit 22C controls the overall operation of the information processing apparatus 2C. The calculation unit 22C includes the acquisition unit 221, an unpurchased item processing unit 222C, the purchase unit 223, the purchased item processing unit 224, and a duplication unit 228. By the calculation unit 22C executing the information processing application, functions of the acquisition unit 221, the unpurchased item processing unit 222C, the purchase unit 223, the purchased item processing unit 224, and the duplication unit 228 are implemented.

Hereinafter, it is assumed that the space creator (participant) edits the virtual reality space alone.

The duplication unit 228 duplicates a pay item arranged in the virtual reality space and arranges the pay item in the virtual reality space on the basis of duplication operation information indicating a duplication operation by the participant having the editing authority of the virtual reality space. In a case where the participant duplicates and arranges the pay item purchased by the participant, the duplication unit 228 processes the pay item arranged by duplication as the purchased item purchased by the participant. In a case where the participant duplicates and arranges an unpurchased item that has not been purchased by the participant, the duplication unit 228 processes the unpurchased item arranged by duplication as an unpurchased item that has not been purchased by the participant. The duplication unit 228 may duplicate a free item which is an existing item.

As described above, the item processing operation includes the new arrangement operation, the position changing operation, the direction changing operation, the deleting operation, and the operation of changing the size or the like. In addition to these, the item processing operation includes a duplication operation of designating an existing item, generating an item (hereinafter referred to as a "duplicated item") obtained by duplicating the existing item, and arranging the item in the virtual reality space.

When the space creator operates the operating unit 24 and performs the duplication operation subsequent to the existing item selecting operation, the information processing apparatus 2C generates duplication operation information that is the item processing information indicating the duplication operation, and outputs the duplication operation information to the duplication unit 228. The duplication operation is, for example, an operation of selecting a duplicate button displayed when an existing item is selected. The duplication operation information includes the space creator ID of the participant (space creator) who has performed the duplication operation, the item ID of the existing item that is the target of the duplication operation, information indicating the arrangement position of the existing item that is the target of the duplication operation, information indicating that the item processing operation is the duplication operation, and information indicating the arrangement position of the duplicated item (hereinafter referred to as "duplication position information"). The arrangement position indicated by the duplication position information is, for example, a position determined by the information processing apparatus 2 according to the arrangement position of the existing item that is the target of the duplication operation by the information processing apparatus 2. The position determined according to the arrangement position of the existing item that is the target of the duplication operation is, for example, a position separated from the position of the existing item by a predetermined distance in the horizontal direction orthogonal to the line-of-sight direction of the avatar. Furthermore, for example, in a case where there is another existing item at the position, the position determined according to the arrangement position of the existing item that is the target of the duplication operation is a peripheral position at which the position does not overlap with the other existing items.

Upon acquiring the duplication operation information, the duplication unit 228 edits the space data under creation stored in the storage unit 25 such that the existing item identified by the item ID included in the duplication operation information and the information indicating the arrangement position is duplicated, and the duplicated item is arranged at the arrangement position indicated by the duplication position information.

Here, by referring to the storage unit 25, the duplication unit 228 can determine whether the existing item that is the target of the duplication operation is a free item, a purchased item that has been purchased by the participant indicated by the space creator ID included in the duplication operation information, or an unpurchased item that has not been purchased by the participant. In a case where the existing item that is the target of the duplication operation is the purchased item, the duplication unit 228 executes processing of arranging the duplicated item in the virtual reality space as the purchased item purchased by the participant. Furthermore, in a case where the existing item that is the target of the duplication operation is an unpurchased item, the duplication unit 228 executes processing of arranging the duplicated item in the virtual reality space as an unpurchased item that has not been purchased by the participant. The acquisition unit 221 generates the item selection information after acquiring the item ID of the item selected by the new item selecting operation. The item selection information is information including the space creator ID of the space creator who has performed the new item selecting operation and the item ID of the selected item.

For the existing items, as described above, the determination results of the charging determination and the purchase state determination at the time of the new arrangement operation are stored in the storage unit 25. For example, in a case where the existing item is a purchased item purchased by the participant, the item ID of the existing item, the space creator ID of the participant, and the information indicating that the item is purchased are stored in the storage unit 25 in association with each other. The existing item and the duplicated item that are the targets of the duplication operation have the same item ID. In a case where both the participants are the same, the processing by the duplication unit 228 is a process of duplicating the purchased item as the purchased item and duplicating the unpurchased item as the unpurchased item. Therefore, even if the duplicated item is arranged, the item ID of the existing item, the space creator ID of the participant, and the information indicating that the item has been purchased, which are stored in the storage unit 25, are not changed.

The duplication unit 228 transmits the item processing information as the duplication operation information to the space creation server 4. The transmission of the item processing information from the duplication unit 228 to the space creation server 4 is performed, for example, at a timing when it is determined that each item processing operation is temporarily ended or at a predetermined time interval.

Hereinafter, it is assumed that a plurality of space creators (participants) jointly edit the virtual reality space.

For example, in a case where the first participant and the second participant perform joint editing, the duplication unit 228 may duplicate the pay item arranged in the virtual reality space and arrange the pay item in the virtual reality space on the basis of the duplication operation information indicating the duplication operation by the first participant or the second participant. In a case where the participant duplicates and arranges the pay item purchased by one of the first participant and the second participant, the duplication unit 228 processes the pay item arranged by duplication as a purchased item purchased by the participant. In addition, in a case where the participant replicates and arranges an unpurchased item that has not been purchased by one of the first participant and the second participant, the duplication unit 228 processes the unpurchased item arranged by the replication as an unpurchased item that has not been purchased by the participant.

In the joint editing by a plurality of participants, the duplication unit 228 duplicates the purchased item purchased by each participant as the purchased item in a case where each participant duplicates the purchased item by himself or herself, and duplicates the unpurchased item not purchased by each participant as the unpurchased item in a case where each participant duplicates the unpurchased item by himself or herself. Therefore, even if the duplicated item is arranged, the item ID of the existing item, the space creator ID of the participant, and the information indicating that the item has been purchased, which are stored in the storage unit 25, are not changed.

Here, the duplication unit 228 can determine whether the participant who has performed the duplication operation and the participant who has arranged the existing item to be duplicated are the same person by referring to the space creator ID included in the duplication operation information and the information regarding the existing item that is the target of the duplication operation stored in the storage unit 25.

In a case where both the participants are determined to be the same, the duplication unit 228 can determine whether the existing item that is the target of the duplication operation is a free item, a purchased item purchased by the participant indicated by the space creator ID included in the duplication operation information, or an unpurchased item that has not been purchased by the participant by referring to the storage unit 25.

On the other hand, in a case where it is determined that both the participants are not the same, the duplication unit 228 refers to the storage unit 25 and determines whether or not the determination result of the purchase state determination related to the participant who has performed the duplication operation is stored for the existing item that is the target of the duplication operation. When the determination result of the purchase state determination is stored, the duplication unit 228 acquires the determination result from the storage unit 25. In addition, in a case where the determination result of the purchase state determination is not stored, the duplication unit 228 transmits the duplication operation information to the item management server 3 via, for example, the space creation server 4. Upon acquiring the duplication operation information, the item management server 3 transmits the determination result of the purchase state determination for the existing item that is the target of the duplication operation to the information processing apparatus 2 via the space creation server 4, for example, in a processing procedure similar to that in a case where the item selection information is acquired from the acquisition unit 221 described above.

The duplication unit 228 can determine whether the existing item that is the target of the duplication operation is a purchased item that has been purchased by the participant who has performed the duplication operation or an unpurchased item that has not been purchased by the participant who has performed the duplication operation by referring to the determination result of the purchase state determination for the selected item acquired from the item management server 3. The duplication unit 228 stores the determination result of the purchase state determination for the existing item that is the target of the duplication operation in the storage unit 25 in association with the item ID or the like.

The subsequent processing by the duplication unit 228 in a case where both the participants are not the same will be described later.

In a case where the second participant who has not purchased the pay item duplicates and arranges the pay item arranged by the first participant in the virtual reality space, the duplication unit 228 may process the pay item arranged by duplication as an unpurchased item arranged by the second participant regardless of whether the first participant has purchased the pay item or not.

In the joint editing by a plurality of participants, in a case where an existing item as a pay item that has been purchased or has not been purchased by a certain participant (for example, a first participant) is duplicated by another participant (for example, a second participant) who has not purchased the pay item, the duplication unit 228 arranges the duplicated item as an unpurchased item arranged by another participant (second participant).

In a case where another participant (second participant) has never newly arranged or arranged by duplicating an item of the same type as the existing item that has been the target of the duplication operation so far, the storage unit 25 does not store data in which the space creator ID of another participant (second participant) is associated with the item ID of the duplicated item. Therefore, when arranging the duplicated item, the duplication unit 228 newly stores the item ID of the duplicated item, the space creator ID of another participant (second participant), and information indicating that the duplicated item has not been purchased in association with each other in the storage unit 25.

In the joint editing by a plurality of participants, for example, in a case where the duplication unit 228 duplicates an existing item as a pay item that has been purchased by a certain participant (for example, the first participant) by another participant (for example, the second participant) who has not purchased the pay item, arranging the duplicated item as a pay item that has been purchased by another participant (the second participant) may be undesirable for the item provider of the pay item. On the other hand, in a similar case, the duplication unit 228 arranges the duplicated item as an unpurchased item arranged by another participant (second participant), thereby adjusting the balance between the participant (space creator) and the item provider.

Note that, in a case where the information processing apparatus 2C includes the registration unit 226 similarly to the information processing apparatus 2B, when the duplication unit 228 arranges the duplicated item as a pay item that has not been purchased by another participant (second participant), the registration unit 226 registers the unpurchased item as the duplicated item in the purchase cart of the other participant (second participant).

In addition, similarly to a case where the unpurchased item processing unit 222 makes the mode of arrangement of the unpurchased item different from the mode of arrangement of the purchased item, the duplication unit 228 may make the mode of arrangement of the unpurchased item arranged as a duplicated item different from the mode of arrangement of the purchased item.

As one mode in which the mode of arrangement of the unpurchased item is different from the mode of arrangement of the purchased item, in a case where the duplication unit 228 changes the mode of arrangement of the unpurchased item as the duplicated item when a preset time elapses after arranging the unpurchased item as the duplicated item in the virtual reality space, the duplication unit 228 may measure the time after arranging the unpurchased item as the duplicated item. Furthermore, in this case, if the existing item of the duplication source is an unpurchased item, the duplication unit 228 may change all the modes of arrangement of the duplicated items that are duplicates of the unpurchased item of the duplication source at the same time as changing the mode of arrangement of the unpurchased item of the duplication source.

For example, in a case where the preset time is a relatively short time of about one minute, the duplication unit 228 measures the time from when the unpurchased item as the duplicated item is arranged, and changes the mode of arrangement of the unpurchased item as the duplicated item when the preset time elapses. In addition, for example, in a case where the preset time is a relatively long time such as about five to ten minutes, the duplication unit 228 changes the mode of arrangement of the unpurchased item of the duplication source, and at the same time, changes all the modes of arrangement of the duplicated item that is a duplicate of the unpurchased item of the duplication source.

Furthermore, in the joint editing by a plurality of participants, in a case where a pay item arranged in the virtual reality space by a certain participant (for example, the first participant) is duplicated and arranged by another participant (for example, the second participant) who has purchased the pay item, the duplication unit 228 may process the duplicated item as a purchased item arranged by another participant (the second participant) regardless of whether the certain participant (the first participant) has purchased or not purchased the pay item.

With respect to the pay item arranged in the virtual reality space arranged by the first participant, regardless of whether the first participant has purchased or has not purchased the pay item, the duplication unit 228 may prohibit duplication of the pay item by the second participant who has not purchased the pay item.

In a case where the joint editing is performed by a plurality of participants, the duplication unit 228 determines that a certain participant (for example, the first participant) cannot duplicate an existing item as a purchased or unpurchased pay item by another participant (for example, the second participant) who has not purchased the pay item even if the participant selects another participant (for example, the second participant) and tries to duplicate the pay item.

In the joint editing by a plurality of participants, for example, in a case where another participant (for example, the second participant) who has not purchased the pay item tries to duplicate an existing item as a pay item arranged by a certain participant (for example, the first participant), it may be undesirable for the item provider of the pay item if the duplication unit 228 can arrange the duplicated item. On the other hand, in a similar case, the duplication unit 228 can adjust the balance between the participant (space creator) and the item provider by prohibiting duplication by another participant (second participant).

In a case where a purchased item that is a pay item purchased by the first participant is duplicated and arranged by a second participant who has not purchased the purchased item while the first participant participates in the virtual reality space, the duplication unit 228 may process the purchased item arranged by duplication as a purchased item purchased and arranged by the first participant.

In the joint editing by a plurality of participants, in a case where, while a certain participant (for example, the first participant) participates in the virtual reality space, another participant (second participant) who has not purchased the purchased item duplicates and arranges the purchased item, the duplication unit 228 arranges the duplicated item as the purchased item purchased and arranged by the certain participant (first participant).

On the other hand, after a certain participant (first participant) leaves the virtual reality space, in a case where another participant (second participant) who has not purchased the purchased item duplicates and arranges the purchased item, the duplicated item may be arranged as an unpurchased item arranged by another participant (second participant), or duplicating and arranging of the purchased item itself by another participant (second participant) who has not purchased the purchased item may be prohibited.

In the joint editing by a plurality of participants, for example, in a case where there is a purchased item purchased by a certain participant, the participant can create the virtual reality space by freely using the purchased item while participating in the virtual reality space under creation. Therefore, while the participant participates in the virtual reality space, even if other participants can freely use the purchased item, there may be no problem for the item provider of the pay item as long as the other participants themselves are not processed as the purchased item.

The duplication unit 228 can adjust the balance between the participant (space creator) and the item provider by performing the processing as described above.

Note that, in the joint editing by a plurality of participants, in a case where there is a pay item that has been purchased by a certain participant (for example, the first participant), in a case where another participant (for example, the second participant) who has not purchased the pay item selects the same pay item as the pay item by the new item selecting operation and newly arranges the pay item, the information processing apparatus 2C may arrange the newly arranged pay item as a purchased item that has been purchased by a certain participant (first participant) or as an unpurchased item that has not been purchased by another participant (second participant). As described above, the information processing apparatus 2C may perform different or the same processing on a pay item purchased by a certain participant in a case where the pay item is duplicated by another participant who has not purchased the pay item and in a case where the pay item is newly arranged. Which processing is to be performed is determined in consideration of the balance between the participant (space creator) and the item provider.

(Information Processing Method)

Figure 7:
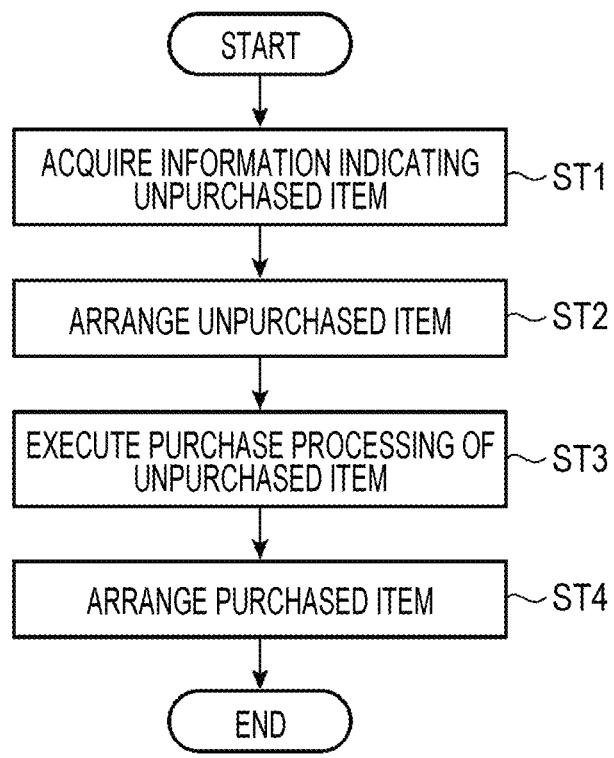
FIG. 7 is a flowchart illustrating an information processing method according to the first embodiment.

FIG. 7 is a flowchart illustrating an information processing method according to the first embodiment.

The acquisition unit 221 acquires the information indicating an unpurchased item (step ST1).

The unpurchased item processing unit 222 executes the unpurchased item arrangement processing of arranging the unpurchased item in the virtual reality space on the basis of the information indicating an unpurchased item (step ST2).

The purchase unit 223 executes the purchase processing of the unpurchased item on the basis of the purchase operation information performed after arrangement in the virtual reality space (step ST3).

After the purchase processing of the unpurchased item, the purchased item processing unit 224 executes purchased item arrangement processing of arranging the purchased item in the virtual reality space (step ST4).

In the first embodiment and the modifications so far, at least the space creation terminal includes all the functions of the information processing apparatus 2. As described above, in the information processing system 1, a part or all of the functions of the information processing apparatus 2 may be included in the space creation terminal or may be included in the space creation server 4. The same applies to the information processing systems 1A to 1C and the information processing apparatuses 2A to 2C. In a case where the space creation server 4 has part or all of functions of the information processing apparatus 2 to 2C, the space creation server 4 can transmit information necessary for the space creation terminal among the information acquired in a case where each function is executed. For example, in a case where the space creation server 4 edits the space data under creation stored in the storage device for a space server, data including a portion of the data after edit can be transmitted to the space creation terminal as necessary.

For example, in a case where the space creation server 4 includes the acquisition units 221 and 221A, the space creation server 4 performs the above-described pre-processing, and acquires, from the space creation terminal, information indicating that the item selecting operation has been performed in the space creation terminal, the information indicating an unpurchased item, or the like, so that the subsequent processing can be performed. Furthermore, for example, in a case where the space creation server 4 includes the unpurchased item processing units 222, 222B, and 222C, the space creation server 4 can perform the following processing by acquiring the information indicating an unpurchased item from the space creation terminal or the acquisition units 221 and 221A included in the space creation server 4. Furthermore, for example, in a case where the space creation server 4 includes the purchase unit 223, the space creation server 4 can perform the subsequent processing by acquiring, from the space creation terminal, information or the like indicating that the item purchase operation has been performed in the space creation terminal. Furthermore, for example, in a case where the space creation server 4 includes the purchased item processing unit 224, the space creation server 4 can perform the subsequent processing by acquiring the purchase completion notification from the space creation terminal or the purchase unit 223 included in the space creation server 4.

Furthermore, for example, in a case where the space creation server 4 includes the group information acquisition unit 225, the group information acquisition unit 225 of the space creation server 4 can perform the subsequent processing by acquiring the group information managed by the item management server 3 from the item management server 3. Furthermore, for example, in a case where the space creation server 4 includes the registration unit 226, the space creation server 4 can perform the subsequent processing by acquiring the item processing information from the space creation terminal or the unpurchased item processing unit 222B included in the space creation server 4. Furthermore, for example, in a case where the space creation server 4 includes the unpurchased item deleting unit 227, the space creation server 4 can perform the following processing by acquiring, from the space creation terminal, information or the like indicating that the deleting operation has been performed in the space creation terminal. Furthermore, for example, in a case where the space creation server 4 includes the duplication unit 228, the space creation server 4 can perform the subsequent processing by acquiring, from the space creation terminal, information or the like indicating that the duplication operation has been performed in the space creation terminal.

As described above, the information processing apparatus 2 according to the first embodiment includes the acquisition unit 221 that acquires information indicating an unpurchased item, the unpurchased item processing unit 222 that executes the unpurchased item arrangement processing of arranging the unpurchased item in the virtual reality space on the basis of the information indicating the unpurchased item, the purchase unit 223 that executes the purchase processing of the unpurchased item on the basis of the purchase operation information indicating the purchase operation after arrangement in the virtual reality space, and the purchased item processing unit 224 that executes the purchased item arrangement processing of arranging the purchased item after the purchase processing of the unpurchased item.

Thus, the information processing apparatus 2 according to the first embodiment enables confirmation of a state in which an unpurchased item is arranged in the virtual reality space.

In the information processing apparatus 2B according to the first embodiment includes the registration unit 226 that registers the unpurchased item in the purchase cart when the unpurchased item processing unit 222 arranges the unpurchased item in the virtual reality space.

Thus, the information processing apparatus 2B according to the first embodiment can automatically register an unpurchased item in the purchase cart as the unpurchased item is arranged.

The unpurchased items arranged in the virtual reality space are pay items that the space creator may purchase. Automatically registering the arranged unpurchased items in the purchase cart is more convenient for the space creator than manually registering the unpurchased items in the purchase cart separately from the arrangement operation of the unpurchased items.

The information processing apparatus 2B according to the first embodiment includes the unpurchased item deleting unit 227 that deletes an unpurchased item arranged in the virtual reality space on the basis of deleting operation information indicating a deleting operation of an unpurchased item. In a case where all the unpurchased items arranged in the virtual reality space are deleted, the registration unit 226 deletes the registration of the unpurchased items in the purchase cart.

Thus, the information processing apparatus 2B according to the first embodiment can automatically delete the unpurchased items, all of which have been deleted from the virtual reality space, from the purchase cart.

The unpurchased items all deleted from the virtual reality space by the space creator are pay items that are unlikely to be purchased by the space creator. Automatically deleting the unpurchased items, all of which have been deleted, from the purchase cart is more convenient for the space creator than manually deleting the unpurchased items from the purchase cart separately from the operation of deleting the unpurchased items.

In the information processing apparatus 2B according to the first embodiment, the unpurchased item processing unit 222B changes the mode of arrangement of the unpurchased item when a preset time elapses after arranging the unpurchased item in the virtual reality space. The registration unit 226 maintains the registration of the unpurchased items in the purchase cart even after the mode of arrangement of the unpurchased items is changed by the unpurchased item processing unit 222B.

Thus, the information processing apparatus 2B according to the first embodiment can maintain the registration of the unpurchased item whose mode of arrangement has been changed with the elapse of the preset time in the purchase cart.

The change in the mode of arrangement of the unpurchased item due to the elapse of the preset time is irrelevant to the purchase intention of the space creator. For example, even if an unpurchased item is deleted due to elapse of the preset time, the space creator may want to purchase the unpurchased item. Therefore, maintaining the registration of the unpurchased item whose mode of arrangement has been changed in the purchase cart is more convenient for the space creator than a case where the unpurchased item whose mode of arrangement has been changed is automatically deleted from the purchase cart.

In the information processing apparatus 2 according to the first embodiment, the unpurchased item processing unit 222 changes the position or direction of arrangement of the unpurchased items on the basis of item processing information indicating an operation of changing the position or direction of arrangement of the unpurchased items, and arranges the unpurchased items in the virtual reality space.

Thus, the information processing apparatus 2 according to the first embodiment enables the space creator to select an unpurchased item with respect to the unpurchased item whose arrangement position or direction has been once confirmed, and change the arrangement position or direction of the unpurchased item.

For example, the space creator may want to change the arrangement position or direction of the selected unpurchased item after determining the arrangement position or direction of the selected unpurchased item by the new arrangement operation. In addition, after arranging the selected unpurchased item at the initial position, the unpurchased item processing unit 222 may cancel the state in which the unpurchased item is selected and temporarily confirmed the arrangement position. Therefore, enabling the space creator to select an unpurchased item whose arrangement position or direction has been confirmed and change the arrangement position or direction of the unpurchased item is more convenient for the space creator than preventing the position or direction of the unpurchased item whose arrangement position or direction has been confirmed from being changed.

In the information processing apparatus 2 according to the first embodiment, the unpurchased item processing unit 222 makes a mode of arrangement of the unpurchased item different from a mode of arrangement of a purchased item that is the purchased pay item among the pay items.

Thus, the information processing apparatus 2 according to the first embodiment can make the mode of arrangement of the unpurchased items different from the mode of arrangement of the purchased items in various modes.

In the information processing apparatus 2 of the present embodiment, the unpurchased item processing unit 222 makes the mode of arrangement of the unpurchased item different from the mode of arrangement of the purchased item, so that a certain restriction can be added to the mode of use of the unpurchased items, and the balance of interests between the space creator and the item provider can be adjusted.

In the information processing apparatus 2 according to the first embodiment, the unpurchased item processing unit 222 changes the mode of arrangement of the unpurchased item when a preset time elapses after arranging the unpurchased items in the virtual reality space.

Thus, the information processing apparatus 2 according to the first embodiment can change the arrangement mode of the unpurchased item when a preset time elapses, for example, assuming that the mode of arrangement of the purchased item and the unpurchased item is the same at the time of arranging the unpurchased item in the virtual reality space.

It is highly convenient if the space creator can confirm a situation in a case where an unpurchased item is arranged in the virtual reality space as a purchased item. On the other hand, when a preset time elapses, by changing the mode of arrangement of the unpurchased items, a certain restriction can be added to the mode of use of the unpurchased items, and the balance between the space creator and the item provider can be adjusted.

In the information processing apparatus 2 according to the first embodiment, the unpurchased item processing unit 222 makes a mode of arrangement of the unpurchased items different between a mode in a case of being browsed by a participant who does not have the editing authority of the virtual reality space and a mode in a case of being browsed by a participant who has the editing authority of the virtual reality space.

Thus, the information processing apparatus 2 according to the first embodiment can make the mode when the general participant who does not have the editing authority of the virtual reality space browses the unpurchased item different from the mode when the general participant browses the purchased item.

In a case where the general participant participates in the virtual reality space under creation, if the unpurchased item is simply made available to the space creator, for the general participant, both the unpurchased item and the purchased item arranged in the virtual reality space look the same as the virtual reality space, which is not preferable for the item provider of the pay item. By making the mode when the general participant who does not have the editing authority of the virtual reality space browses the unpurchased item different from the mode when the general participant browses the purchased item, a certain restriction can be added to the mode of use of the unpurchased item, and the balance between the space creator and the item provider can be adjusted.

The information processing apparatus 2C according to the first embodiment includes the duplication unit 228 that duplicates the pay item arranged in the virtual reality space and arranges the same in the virtual reality space on the basis of the duplication operation information indicating the duplication operation by the participant having editing authority of the virtual reality space. In a case where the participant duplicates and arranges the pay item that has been purchased by the participant, the duplication unit 228 processes the pay item arranged by the duplication as the purchased item that has been purchased by the participant, and in a case where the participant duplicates and arranges the unpurchased item that has not been purchased by the participant, the duplication unit 228 processes the unpurchased item arranged by duplication as the unpurchased item that has not been purchased by the participant.

Thus, the information processing apparatus 2C according to the first embodiment can execute processing of arranging the duplicated item as the purchased item that has been purchased by the participant in a case where the existing item that is the target of the duplication operation is the purchased item, and arranging the duplicated item as the unpurchased item that has not been purchased by the participant in a case where the existing item that is the target of the duplication operation is the unpurchased item.

For example, there is a case where the participant (space creator) creates the virtual reality space by arranging a plurality of the same existing items around the existing items. In this case, the work efficiency can be enhanced by performing a selecting operation of an existing item rather than searching for and selecting the same item as the existing item from the item list 231. For the purchased item and the unpurchased item, arranging the duplicated item without changing the purchase state is more convenient for the space creator than arranging only from the item list 231.

In the information processing apparatus 2C according to the first embodiment, in a case where the first participant having the editing authority of the virtual reality space arranges the unpurchased item, the unpurchased item processing unit 222C arranges the unpurchased item in the virtual reality space in a mode browsable by the first participant and the second participant having the editing authority of the virtual reality space.

Thus, the information processing apparatus 2C according to the first embodiment allows other participants to view the unpurchased item arranged by any participant in the joint editing by the plurality of participants.

In the joint editing, when all the participants can view the items arranged by other participants, each participant can visually confirm a position where the item can be arranged, so that the item can be efficiently arranged, and each participant can have a feeling of editing in cooperation with each other. In addition, since the other participants can confirm the state in which the unpurchased item is arranged in the virtual reality space, it is also useful for the purchase determination of the other participants themselves.

The information processing apparatus 2C according to the first embodiment includes the duplication unit 228 that duplicates the pay item arranged in the virtual reality space and arranges the pay item in the virtual reality space on the basis of duplication operation information indicating a duplication operation by the first participant or the second participant. The duplication unit 228 processes the pay item arranged by duplication as the purchased item that has been purchased by the participant in a case where the participant duplicates and arranges the pay item that has been purchased by one of the first participant and the second participant, and processes the unpurchased item arranged by duplication as the unpurchased item that has not been purchased by the participant in a case where the participant duplicates and arranges the unpurchased item that has not been purchased by one of the first participant and the second participant.

Thus, in a case where each participant duplicates the purchased item by himself or herself in the joint editing by a plurality of participants, the information processing apparatus 2C according to the first embodiment can duplicate the purchased item that has been purchased by each participant as the purchased item, and can duplicate the unpurchased item that has not been purchased by each participant as the unpurchased item in a case where each participant duplicates the unpurchased item by himself or herself.

Even in the joint editing, arranging the duplicated item without changing the purchase state of the purchased item and the unpurchased item is more convenient for the participant (space creator) than arranging only from the item list 231.

In the information processing apparatus 2C according to the first embodiment, in a case where the second participant who has not purchased the pay item duplicates and arranges the pay item arranged by the first participant in the virtual reality space, the duplication unit 228 processes the pay item arranged by duplication as an unpurchased item arranged by the second participant regardless of whether the first participant has purchased or not purchased the pay item.

Thus, in a case where an existing item as a pay item purchased by a certain participant is duplicated by another participant who has not purchased the pay item in the joint editing by a plurality of participants, the information processing apparatus 2C according to the first embodiment can arrange the duplicated item as an unpurchased item arranged by another participant, and can adjust the balance between the participant (space creator) and the item provider.

In the information processing apparatus 2C according to the first embodiment, with respect to the pay item arranged in the virtual reality space by the first participant, regardless of whether the first participant has purchased or has not purchased the pay item, the duplication unit 228 prohibits duplication of the pay item by the second participant who has not purchased the pay item.

Thus, in a case where another participant who has not purchased the pay item attempts to duplicate an existing item as a pay item arranged by a certain participant in the joint editing by a plurality of participants, the information processing apparatus 2C according to the first embodiment can adjust the balance between the participant (space creator) and the item provider by prohibiting duplication by another participant.

In the information processing apparatus 2C according to the first embodiment, in a case where the second participant who has not purchased the purchased item duplicates and arranges the purchased item that is a pay item that has been purchased by the first participant while the first participant participates in the virtual reality space, the duplication unit 228 processes the purchased item arranged by duplication as a purchased item purchased and arranged by the first participant.

Thus, in a case where the purchased item purchased by a certain participant is duplicated and arranged by another participant who has not purchased the purchased item while the certain participant participates in the virtual reality space in the joint editing by the plurality of participants, the information processing apparatus 2C according to the first embodiment can adjust the balance between the participant (space creator) and the item provider by arranging the duplicated item as the purchased item purchased and arranged by a certain participant.

The information processing apparatus 2A according to the first embodiment includes a group information acquisition unit 225 that acquires group information that is information of a group to which each participant belongs for a plurality of participants having editing authority of a virtual reality space. In a case where the acquisition unit 221A determines that the first participant and the second participant belong to the same group on the basis of the group information, with respect to the purchased item that is a pay item that has been purchased by one of the first participant and the second participant, the acquisition unit 221A processes the purchased item arranged in the virtual reality space on the basis of the arrangement operation information indicating the arrangement operation of the purchased item by the first participant or the second participant as a purchased item that has been purchased by the group.

Thus, the information processing apparatus 2A according to the first embodiment can cause all the plurality of participants to use the purchased item for creating the virtual reality space as a purchased item purchased by themselves even if the purchased item has been purchased by only one of the plurality of participants belonging to the same group. The plurality of participants (space creators) belonging to the same group can freely edit the space data under creation using the information processing apparatus 2A, and convenience for the space creator is high.

In the information processing apparatus 2 according to the first embodiment, the purchase unit 223 executes the purchase processing of a plurality of types of unpurchased items on the basis of the selecting operation information indicating the selecting operation for selecting the plurality of types of unpurchased items arranged in the virtual reality space and the purchase operation information.

Thus, the information processing apparatus 2 according to the first embodiment can provide the space creator with a means for collectively purchasing a plurality of unpurchased items, which is highly convenient for the space creator.

The program according to the first embodiment causes a computer to function as the information processing apparatus 2. The program according to the first embodiment can cause a computer to function as the information processing apparatus 2 that enables confirmation of a state in which an unpurchased item is arranged in the virtual reality space.

The information processing method according to the first embodiment includes acquiring, by the acquisition unit 221, information indicating an unpurchased item, executing, by the unpurchased item processing unit 222, unpurchased item arrangement processing of arranging the unpurchased item in the virtual reality space on the basis of the information indicating the unpurchased item, executing, by the purchase unit 223, purchase processing of the unpurchased item on the basis of purchase operation information indicating a purchase operation after arrangement in the virtual reality space, and executing, by the purchased item processing unit 224, a purchased item arrangement process of arranging the purchased item after the purchase processing of the unpurchased item.

Thus, the information processing method according to the first embodiment enables confirmation of a state in which the unpurchased item is arranged in the virtual reality space.

What is claimed is:
1. A non-transitory computer-readable storage medium storing a program which, when executed by an information processing apparatus, causes the information processing apparatus to perform a method comprising:
   performing pre-processing before a space creator starts a space creating operation, wherein the pre-processing includes storing, in a local memory in advance, three-dimensional data of one or more items, metadata of the one or more items other than an item ID, charging information of the one or more items, and purchase information of the one or more items;
   acquiring information indicating an unpurchased item that is a selected unpurchased pay item among pay items that are pieces of three-dimensional data arrangeable in a virtual reality space,
   wherein in a case that the three-dimensional data of the selected unpurchased pay item was acquired in advance, the three-dimensional data is acquired from the local memory, and in a case that the three-dimensional data was not acquired in advance, the three-dimensional data is acquired from another device,
   wherein the three-dimensional data that is acquired in advance includes at least one of a frequently used item, a free item, and a purchased item that has been purchased by a logged-in space creator and has not been arranged in the virtual reality space;

arranging the unpurchased item in the virtual reality space based on the information indicating the unpurchased item, wherein a mode of arrangement of the unpurchased item is different from a mode of arrangement of a purchased item that is a purchased pay item among the pay items, wherein the arrangement of the unpurchased item is displayed having fewer details compared to an arrangement of the purchased item;

acquiring three-dimensional data for the unpurchased item based on the mode of arrangement of the unpurchased item;

automatically registering the unpurchased item in a purchase cart in response to arranging the unpurchased item in the virtual reality space;

executing purchase processing of the unpurchased item based on purchase operation information indicating a purchase operation of the unpurchased item performed after arrangement in the virtual reality space; and arranging a purchased item that is a pay item purchased in the virtual reality space after the purchase processing of the unpurchased item.

2. The non-transitory computer-readable storage medium storing the program according to claim 1, further comprising:

deleting the unpurchased item arranged in the virtual reality space based on deleting operation information indicating a deleting operation of the unpurchased item, wherein in a case where all the unpurchased items arranged in the virtual reality space are deleted, deleting registration of the unpurchased item in the purchase cart.

3. The non-transitory computer-readable storage medium storing the program according to claim 1, further comprising:

changing a mode of arrangement of the unpurchased item on a condition that a preset time elapses after arranging the unpurchased item in the virtual reality space, and maintaining registration of the unpurchased item in the purchase cart even after the mode of arrangement of the unpurchased item is changed.

4. The non-transitory computer-readable storage medium storing the program according to claim 1, further comprising:

making a mode of arrangement of the unpurchased item different from a mode of arrangement of a purchased item that is the purchased pay item among the pay items, and making a mode of arrangement of the unpurchased items different between a mode in a case of being browsed by a participant who does not have editing authority of the virtual reality space and a mode in a case of being browsed by a participant who has the editing authority of the virtual reality space.

5. The non-transitory computer-readable storage medium storing the program according to claim 1, further comprising:

duplicating the pay item arranged in the virtual reality space and arranging the pay item in the virtual reality space on a basis of duplication operation information indicating a duplication operation by a participant having editing authority of the virtual reality space;

making a mode of arrangement of the unpurchased item different from a mode of arrangement of a purchased item that is the purchased pay item among the pay items; and in a case where the participant duplicates and arranges a pay item that has been purchased by the participant, processing the pay item arranged by duplication as a purchased item that has been purchased by the participant, and in a case where the participant duplicates and arranges the unpurchased item unpurchased by the participant, processing the unpurchased item arranged by duplication as an unpurchased item that has not been purchased by the participant.

6. The non-transitory computer-readable storage medium storing the program according to claim 1, further comprising:

duplicating the pay item arranged in the virtual reality space and arrange the pay item in the virtual reality space on a basis of duplication operation information indicating a duplication operation by a first participant having editing authority of the virtual reality space or a second participant having editing authority of the virtual reality space, arranging the unpurchased item in the virtual reality space in a mode browsable by the first participant and the second participant in a case where the first participant arranges the unpurchased item, and in a case where the participant duplicates and arranges the pay item purchased by one of the first participant and the second participant, processing the pay item arranged by duplication as a purchased item that has been purchased by the participant, and in a case where the participant duplicates and arranges the unpurchased item that has not been purchased by one of the first participant and the second participant, process the unpurchased item arranged by duplication as an unpurchased item that has not been purchased by the participant.

7. The non-transitory computer-readable storage medium storing the program according to claim 6, further comprising:

in a case where the second participant who has not purchased the pay item duplicates and arranges the pay item arranged by the first participant in the virtual reality space, processing the pay item arranged by duplication as an unpurchased item arranged by the second participant regardless of whether the first participant has purchased the pay item or not.

8. The non-transitory computer-readable storage medium storing the program according to claim 6, further comprising:

with respect to the pay item arranged in the virtual reality space arranged by the first participant, regardless of whether the first participant has purchased or has not purchased the pay item, prohibiting duplication of the pay item by the second participant who has not purchased the pay item.

9. The non-transitory computer-readable storage medium storing the program according to claim 6, further comprising:

in a case where the second participant who has not purchased the purchased item duplicates and arranges the purchased item that is a pay item that has been purchased by the first participant while the first participant participates in the virtual reality space, processing the purchased item arranged by duplication as a purchased item purchased and arranged by the first participant.

10. The non-transitory computer-readable storage medium storing the program according to claim 1, further comprising:

duplicating the pay item arranged in the virtual reality space and arranging the pay item in the virtual reality space on a basis of duplication operation information indicating a duplication operation by a first participant or a second participant having editing authority of the virtual reality space;

acquiring group information that is information of a group to which each participant belongs, for a plurality of participants having editing authority of the virtual reality space;

arranging the unpurchased item in the virtual reality space in a mode browsable by the first participant and the second participant in a case where the first participant arranges the unpurchased item; and in a case where the first participant and the second participant belong to the same group on a basis of the group information, with respect to a purchased item that is the pay item that has been purchased by one of the first participant and the second participant, processing the purchased item arranged in the virtual reality space on a basis of arrangement operation information indicating an arrangement operation of the purchased item by the first participant or the second participant as a purchased item that has been purchased by the group.

11. The non-transitory computer-readable storage medium storing the program according to claim 1, further comprising:

changing a position or a direction of arrangement of the unpurchased items on a basis of item processing information indicating an operation of changing a position or a direction of arrangement of the unpurchased items, and arranging the unpurchased item in the virtual reality space.

12. The non-transitory computer-readable storage medium storing the program according to claim 1, further comprising:

changing a mode of arrangement of the unpurchased item when a preset time elapses after arranging the unpurchased item in the virtual reality space.

13. The non-transitory computer-readable storage medium storing the program according to claim 1, further comprising:

in a case where the first participant having the editing authority of the virtual reality space arranges the unpurchased item, arranging the unpurchased item in the virtual reality space in a mode browsable by the first participant and the second participant having the editing authority of the virtual reality space.

14. The non-transitory computer-readable storage medium storing the program according to claim 1, further comprising:

executing purchase processing of a plurality of types of unpurchased items on a basis of selecting operation information indicating a selecting operation of selecting a plurality of types of unpurchased items arranged in the virtual reality space and the purchase operation information.

15. The non-transitory computer-readable storage medium storing the program according to claim 1, wherein the three-dimensional data for the unpurchased item based on the mode of arrangement of the unpurchased item is acquired from a local memory, wherein the acquired three-dimensional data for the unpurchased item is different than three-dimensional data of the purchased item.

16. The non-transitory computer-readable storage medium storing the program according to claim 1, further comprising:

setting an initial appearance of the unpurchased item to a same appearance as the purchased item; and after a predetermined amount of time from arranging the unpurchased item expires, change an appearance of the unpurchased item, wherein the unpurchased item is displayed having fewer details compared to the purchased item.

17. An information processing apparatus comprising the non-transitory computer-readable storage medium configured to perform the method according to claim 1.

18. An information processing method performed by an information processing apparatus, the method comprising:

performing, by processing circuitry, pre-processing before a space creator starts a space creating operation, wherein the pre-processing includes storing, in a local memory in advance, three-dimensional data of one or more items, metadata of the one or more items other than an item ID, charging information of the one or more items, and purchase information of the one or more items;

acquiring, by the processing circuitry, information indicating an unpurchased item that is a selected unpurchased pay item among pay items that are pieces of three-dimensional data arrangeable in a virtual reality space, wherein in a case that the three-dimensional data of the selected unpurchased pay item was acquired in advance, the three-dimensional data is acquired from the local memory, and in a case that the three-dimensional data was not acquired in advance, the three-dimensional data is acquired from another device, wherein the three-dimensional data that is acquired in advance includes at least one of a frequently used item, a free item, and a purchased item that has been purchased by a logged-in space creator and has not been arranged in the virtual reality space;

executing, by the processing circuitry, unpurchased item arrangement processing of arranging the unpurchased item in the virtual reality space on a basis of the information indicating the unpurchased item, wherein a mode of arrangement of the unpurchased item is different from a mode of arrangement of a purchased item that is a purchased pay item among the pay items, wherein the arrangement of the unpurchased item is displayed having fewer details compared to an arrangement of the purchased item;

acquiring three-dimensional data for the unpurchased item based on the mode of arrangement of the unpurchased item;

automatically registering, by the processing circuitry, the unpurchased item in a purchase cart in response to arranging the unpurchased item in the virtual reality space;

executing, by the processing circuitry, purchase processing of the unpurchased item on a basis of purchase operation information indicating a purchase operation of the unpurchased item performed after arrangement in the virtual reality space; and arranging, by the processing circuitry, a purchased item that is the pay item purchased in the virtual reality space after the purchase processing of the unpurchased item.

* * * * *